United States Patent
Hayashida et al.

(10) Patent No.: US 10,981,506 B2
(45) Date of Patent: Apr. 20, 2021

(54) DISPLAY SYSTEM, VEHICLE CONTROL APPARATUS, DISPLAY CONTROL METHOD, AND STORAGE MEDIUM FOR STORING PROGRAM

(71) Applicant: HONDA MOTOR CO., LTD., Tokyo (JP)

(72) Inventors: Yoshimasa Hayashida, Wako (JP); Mutsuki Hirooka, Wako (JP); Kenta Takenaka, Wako (JP); Kei Oshida, Wako (JP); Eiji Ishizuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/736,017

(22) Filed: Jan. 7, 2020

(65) Prior Publication Data

US 2020/0231091 A1    Jul. 23, 2020

(30) Foreign Application Priority Data

Jan. 23, 2019    (JP) .............................. JP2019-009737

(51) Int. Cl.
  *B60R 1/00*    (2006.01)
  *G09G 5/14*    (2006.01)
  *H04N 7/18*    (2006.01)

(52) U.S. Cl.
  CPC ................. *B60R 1/00* (2013.01); *G09G 5/14* (2013.01); *H04N 7/18* (2013.01); *B60R 2300/10* (2013.01); *B60R 2300/20* (2013.01); *B60R 2300/30* (2013.01); *B60R 2300/802* (2013.01); *G09G 2354/00* (2013.01); *G09G 2380/10* (2013.01)

(58) Field of Classification Search
  None
  See application file for complete search history.

(56) References Cited

U.S. PATENT DOCUMENTS

| 2016/0059781 | A1  | 3/2016 | Tatara |
| 2018/0088891 | A1* | 3/2018 | Cheng ................. G06F 3/04883 |
| 2020/0073520 | A1* | 3/2020 | Mohan ............... G06Q 30/0235 |

FOREIGN PATENT DOCUMENTS

JP    2016-048839 A    4/2016

\* cited by examiner

*Primary Examiner* — Talha M Nawaz
(74) *Attorney, Agent, or Firm* — Thomas | Horstemeyer, LLP

(57) ABSTRACT

A display system comprises: a shooting unit configured to shoot a periphery of a vehicle; a display unit configured to display an image shot by the shooting unit: and a display control unit configured to switch a display mode of display of the display unit between a first display mode for displaying a first display region and a second display mode for displaying a second display region that is different from the first display region. When the display mode is switched to the second display mode in a state in which a display range of the display unit has been adjusted in the first display mode, the display control unit displays the second display region based on an adjusted display range.

13 Claims, 14 Drawing Sheets

DISPLAY SYSTEM, VEHICLE CONTROL APPARATUS, DISPLAY CONTROL METHOD, AND STORAGE MEDIUM FOR STORING PROGRAM

CROSS-REFERENCE TO RELATED APPLICATION

This application claims priority to and the benefit of Japanese Patent Application No. 2019-009737 filed on Jan. 23, 2019 the entire disclosure of which is incorporated herein by reference.

BACKGROUND OF THE INVENTION

Field of the Invention

The present invention relates to a display system including a peripheral monitoring system, a vehicle control apparatus, a display control method, and a storage medium for storing a program.

Description of the Related Art

A rearview mirror, door mirrors, and the like are installed in a conventional vehicle for confirming conditions surrounding the vehicle. A driver can drive the vehicle and confirm conditions sideward and rearward of the vehicle using the rearview mirror and the door mirrors while looking ahead of the vehicle.

However, with the known mirrors, there are problems such that there are blind angles, and the air resistance and the vehicle width increase. Therefore, it is possible to replace the known mirrors with electron mirrors that display images around the vehicle using display panels on the condition that the safety standard formulated by the Ministry of Land, Infrastructure, Transport and Tourism is satisfied. Such a system of electron mirrors is referred to as a CMS (Camera Monitor System). As shown in FIG. 5, with the CMS, regions R0, which are in blind angles with the known door mirrors, can be viewed because the regions R0 are covered by regions CMS.

A monitor screen that is divided, in a horizontal direction, into two images, namely an image Pa at a compression rate of 100% and an image Pb at a compression rate of 80%, is shown in Japanese Patent Laid-Open No. 2016-48839.

When the display range in each of a display mode in which the display region is equivalent to that of the mirror and a display mode in which the display region includes a blind angle region can be adjusted by a user, there is a room for improvement regarding the convenience of the user when switching of the display mode is performed.

SUMMARY OF THE INVENTION

The present invention provides a display system in which the convenience of a user is improved when switching of the display mode is performed, a vehicle control apparatus, a display control method, and a storage medium for storing a program.

A display system according to the present invention includes: a shooting unit configured to shoot a periphery of a vehicle; a display unit configured to display an image shot by the shooting unit: and a display control unit configured to switch a display mode of display of the display unit between a first display mode for displaying a first display region and a second display mode for displaying a second display region that is different from the first display region, wherein when the display mode is switched to the second display mode in a state in which a display range of the display unit has been adjusted in the first display mode, the display control unit displays the second display region based on an adjusted display range.

Also, a vehicle control apparatus according to the present invention includes: a traveling control unit that is to be mounted in a vehicle and is configured to control traveling of the vehicle; a shooting unit that is controlled by the traveling control unit, and is configured to shoot a periphery of the vehicle; a display unit configured to display an image shot by the shooting unit; and a display control unit configured to switch a display mode of display of the display unit between a first display mode for displaying a first display region and a second display mode for displaying a second display region that is different from the first display region, wherein when the display mode is switched to the second display mode in a state in which a display range of the display unit has been adjusted in the first display mode, the display control unit displays the second display region based on an adjusted display range.

Also, a display control method according to the present invention is a display control method that is executed in a display system including: a shooting unit configured to shoot a periphery of a vehicle; and a display unit configured to display an image shot by the shooting unit. The display control method includes: switching a display mode of display of the display unit between a first display mode for displaying a first display region and a second display mode for displaying a second display region that is different from the first display region, and displaying, when the display mode is switched to the second display mode in a state in which a display range of the display unit has been adjusted in the first display mode, the second display region based on an adjusted display range.

Also, a display control method according to the present invention is a display control method that is executed in a vehicle control apparatus including: a traveling control unit that is to be mounted in a vehicle and is configured to control traveling of the vehicle; a shooting unit that is controlled by the traveling control unit, and is configured to shoot a periphery of the vehicle; and a display unit configured to display an image shot by the shooting unit. The display control method includes: switching a display mode of display of the display unit between a first display mode for displaying a first display region and a second display mode for displaying a second display region that is different from the first display region, and displaying, when the display mode is switched to the second display mode in a state in which a display range of the display unit has been adjusted in the first display mode, the second display region based on an adjusted display range.

Also, a storage medium storing a program according to the present invention stores a program causing a computer to operate to: switch a display mode for displaying, in a display unit, an image of a periphery of a vehicle shot by a shooting unit between a first display mode for displaying a first display region and a second display mode for displaying a second display region that is different from the first display region; and display, when the display mode is switched to the second display mode in a state in which a display range of the display unit has been adjusted in the first display mode, the second display region based on an adjusted display range.

According to the present invention, the convenience of a user is improved when switching of the display mode is performed.

DESCRIPTION OF THE EMBODIMENTS

Figure 1:
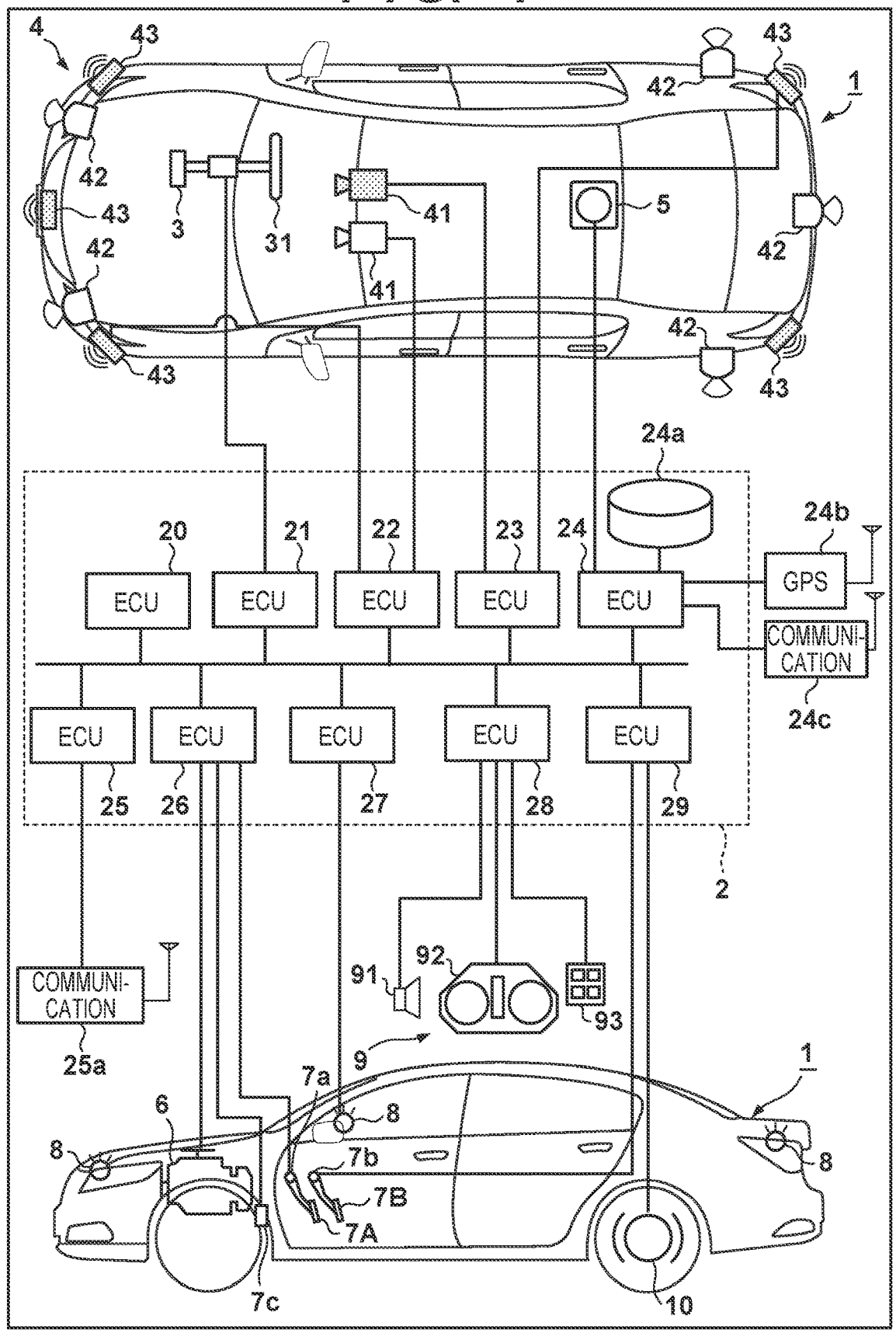
FIG. 1 is a diagram illustrating a configuration of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle control apparatus that controls a vehicle 1 according to one embodiment of the present invention. In FIG. 1, the outline of the vehicle 1 is shown as a plan view and a side view. The vehicle 1 is a sedan type four-wheel passenger car, for example.

The control apparatus in FIG. 1 includes a control unit 2. The control unit 2 includes a plurality of ECUs 20 to 29 that are communicably connected through an in-vehicle network. Each ECU includes a processor represented by a CPU, a storage device such as a semiconductor memory, and an interface for an external device. The storage device stores programs to be executed by the processor, data that the processor uses in processing, and the like. Each ECU may include a plurality of processors, storage devices, and interfaces. Also, the configuration of the control apparatus in FIG. 1 may be realized by a computer that executes the method of the present invention according to a program.

Hereinafter, functions and the like of the ECUs 20 to 29 will be described. Note that the number and functions of the ECUs can be appropriately designed, and more ECUs can be used or some EUCs can be integrated.

The ECU 20 executes control relating to automated driving of the vehicle 1. In the automated driving, at least one of steering and acceleration/deceleration of the vehicle 1 is automatically controlled. In later-described exemplary control, both of steering and acceleration/deceleration are automatically controlled.

The ECU 21 controls an electric power steering apparatus 3. The electric power steering apparatus 3 includes a mechanism for steering the front wheels in accordance with the driving operation (steering operation) of a driver made on a steering wheel 31. Also, the electric power steering apparatus 3 includes a motor that exerts a driving force for assisting the steering operation or automatically steering the front wheels, a sensor for detecting the steering angle, and the like. When the driving state of the vehicle 1 is automated driving, the ECU 21 controls the running direction of the vehicle 1 by automatically controlling the electric power steering apparatus 3 in accordance with the instruction from the ECU 20.

The ECUs 22 and 23 control detection units 41 to 43 that detect conditions around the vehicle, and perform information processing on the detection results. The detection units 41 (hereinafter, may also be denoted as cameras 41) are cameras that captures an image forward of the vehicle 1, and is installed at a roof front part and on an interior side of the front window, in the present embodiment. The contour of an object and lane markings (such as white lines) on a road can be extracted by analyzing images captured by the cameras 41.

Detection units 42 are LIDARs (Light Detection and Ranging), and detect an object around the vehicle 1, and measure the distance to the object. In the case of the present embodiment, five detection units 42 are provided, namely one each at front corners of the vehicle 1, one at the rear center, and one each at rear side faces thereof. Detection units 43 (hereinafter, may also be denoted as radars 43) are millimeter wave radars, and detect an object around the vehicle 1, and measure the distance to the object. In the case of the present embodiment, five radars 43 are provided, namely one at the front center of the vehicle 1, one each at the front corners, and one each at rear corners.

The ECU 22 controls one of the cameras 41 and the detection units 42, and performs information processing on detection results. The ECU 23 controls the other camera 41 and the radars 43, and performs information processing on detection results. As a result of including two sets of apparatuses for detecting conditions around the vehicle, the reliability of the detection result can be improved, and as a result of including different types of detection units such as cameras and radars, the surrounding environment of the vehicle can be analyzed in a multifaceted manner.

The ECU 24 controls a gyrosensor 5, a GPS sensor 24b, and a communication apparatus 24c, and performs information processing on detection results and communication results. The gyrosensor 5 detects the rotational motion of the vehicle 1. The course of the vehicle 1 can be determined based on the detection result of the gyrosensor 5, wheel speed, and the like. The GPS sensor 24b detects the current position of the vehicle 1. The communication apparatus 24c performs wireless communication with a server that provides map information, traffic information, and weather information, and acquires these pieces of information. The ECU 24 can access a database 24a of the map information constructed in a storage device, and searches the route from the current place to a destination, and the like. Note that the database of the aforementioned traffic information and weather information may be constructed in the database 24a.

The ECU 25 includes a communication apparatus 25a for inter-vehicle communication. The communication apparatus 25a performs wireless communication with other vehicles around the vehicle 1, and exchanges information between vehicles.

The ECU 26 controls a power plant 6. The power plant 6 is a mechanism that outputs a driving force for rotating driving wheels of the vehicle 1, and includes an engine and a transmission, for example. The ECU 26 controls the engine output in response to a driving operation (accelerator pedal operation or acceleration operation) made by the driver that has been detected by an operation detection sensor 7a provided in an accelerator pedal 7A, and switches the gear ratio of the transmission based on information such as vehicle speed detected by a vehicle speed sensor 7c, for example. When the driving state of the vehicle 1 is the automated driving, the ECU 26 automatically controls the power plant 6, and controls acceleration and deceleration of the vehicle 1, in response to the instruction from the ECU 20.

The ECU 27 controls lighting devices (such as headlight and taillight) including direction indicators 8 (winkers). In the case of the example in FIG. 1, the direction indicators 8 are provided at the front and rear of the vehicle 1 and at door mirrors.

The ECU 28 controls an input/output apparatus 9. The input/output apparatus 9 outputs information to the driver, and receives information from the driver. An audio output apparatus 91 notifies the driver of information by sound. The display apparatus 92 notifies the driver of information by displaying an image. The display apparatus 92 is arranged in front of a driving seat, for example, and constitutes an instrument panel or the like. Note that sound and display are illustrated here, but the driver may be notified of information using vibration or light. Also, the driver may be notified of information by combining two or more of sound, display, vibration, and light. Moreover, the combination or the reporting mode may be changed in accordance with the level of information (degree of urgency, for example) to be notified of. Also, the display apparatus 92 includes a navigation apparatus.

An input apparatus 93 is arranged at a position at which the driver can operate it, and is a switch group for giving instructions to the vehicle 1. The input apparatus 93 may include a voice input apparatus.

The ECU 29 controls braking apparatuses 10 and a parking brake (not illustrated). The braking apparatuses 10 are disc brake apparatuses, for example, and provided at respective wheels of the vehicle 1 in order to decelerate or stop the vehicle 1 by applying resistance to the rotation of the wheels. The ECU 29 controls the operation of the braking apparatuses 10 in response to the driving operation (brake operation) made by the driver that is detected by an operation detection sensor 7b provided at a brake pedal 7B, for example. When the driving state of the vehicle 1 is automated driving, the ECU 29 controls deceleration or stopping of the vehicle 1 by automatically controlling the braking apparatuses 10 in response to the instruction from the ECU 20. The braking apparatuses 10 and the parking brake can be operated to keep the vehicle 1 at a stopped state. Also, if the transmission of the power plant 6 includes a parking lock mechanism, this mechanism can be operated to keep the vehicle 1 at a stopped state.

The control relating to the automated driving of the vehicle 1 to be executed by the ECU 20 will be described. Upon being instructed the destination and the automated driving by the driver, the ECU 20 automatically controls the traveling of the vehicle 1 toward the destination in accordance with the guide route retrieved by the ECU 24. When automatic control is performed, the ECU 20 acquires information (outside information) regarding the conditions around the vehicle 1 from the ECUs 22 and 23, and controls steering and acceleration and deceleration of the vehicle 1 by instructing the ECUs 21, 26, and 29 based on the acquired information.

Figure 2:
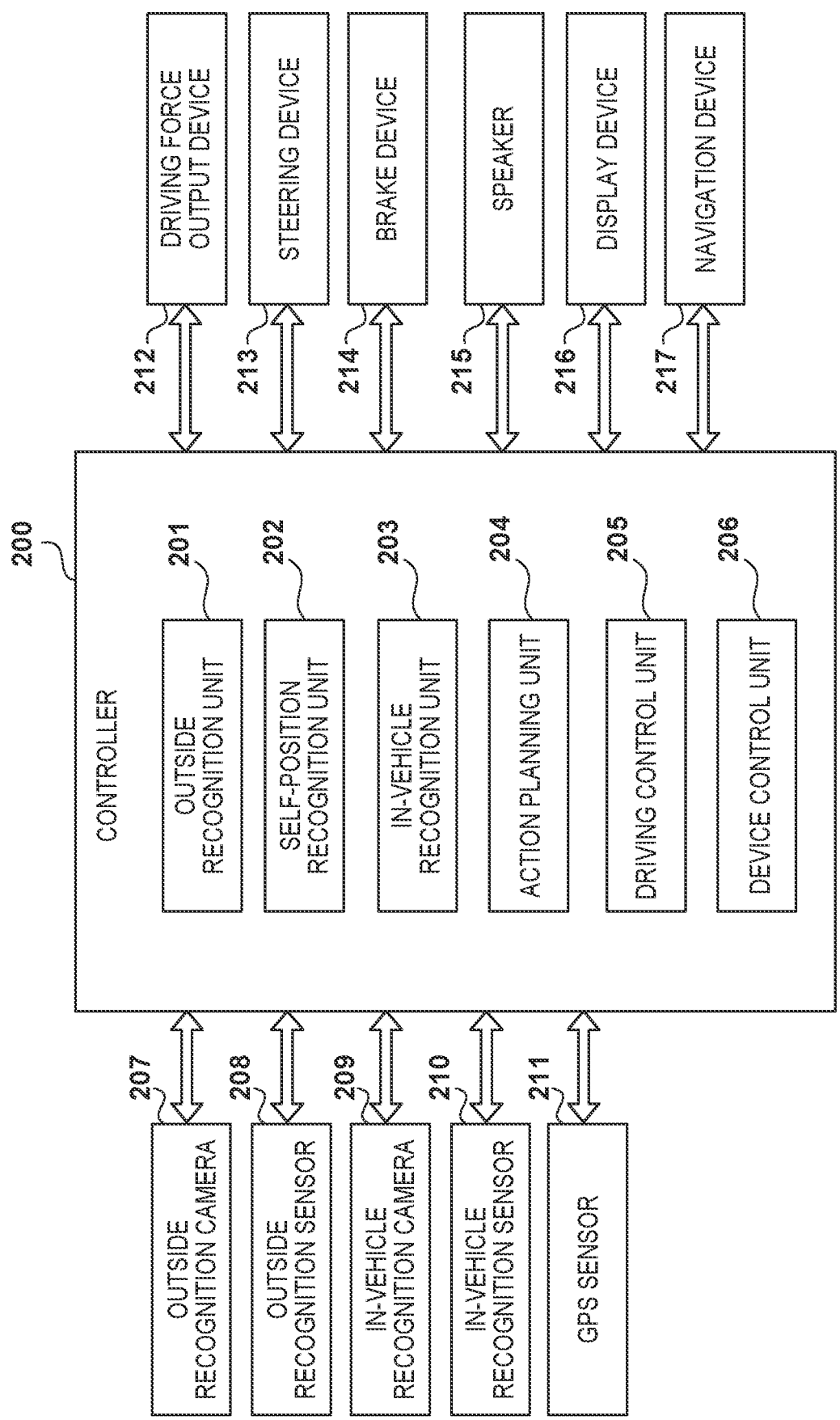
FIG. 2 is a diagram illustrating functional blocks of a control unit.

FIG. 2 is a diagram illustrating the functional blocks of the control unit 2. A controller 200 corresponds to the control unit 2 in FIG. 1, and includes an outside recognition unit 201, a self-position recognition unit 202, an in-vehicle recognition unit 203, an action planning unit 204, a driving control unit 205, and a device control unit 206. Each block can be realized by one ECU or a plurality of ECUs shown in FIG. 1.

The outside recognition unit 201 recognizes the outside information of the vehicle 1 based on signals from outside recognition cameras 207 and outside recognition sensors 208. Here, the outside recognition cameras 207 are the cameras 41 in FIG. 1, for example, and the outside recognition sensors 208 are constituted by the detection units 42 and 43 in FIG. 1, for example. The outside recognition unit 201 recognizes the scene such as an intersection, a railroad crossing, and a tunnel, a free space such as a road shoulder, and behaviors (speeds and running directions) of other vehicles, for example, based on signals from the outside recognition cameras 207 and the outside recognition sensors 208. The self-position recognition unit 202 recognizes the current position of the vehicle 1 based on the signal from the GPS sensor 211. Here, the GPS sensor 211 corresponds to the GPS sensor 24b in FIG. 1, for example.

The in-vehicle recognition unit 203 identifies a passenger in the vehicle 1, and also recognizes the state of the passenger, based on signals from an in-vehicle recognition camera 209 and an in-vehicle recognition sensor 210. The in-vehicle recognition camera 209 is a near infrared camera installed on the display apparatus 92 in the interior of the vehicle 1, for example, and detects the line of sight direction of the passenger, for example. Also, the in-vehicle recognition sensor 210 is a sensor that detects a biological signal of the passenger, for example. The in-vehicle recognition unit 203 recognizes the state of the passenger such as a dozing state or a working state other than driving based on these signals.

The action planning unit 204 plans the action of the vehicle 1 such as an optimum route or a risk aversion route based on the results of recognition by the outside recognition unit 201 and the self-position recognition unit 202. The action planning unit 204 performs entering determination based on a start point and an end point of an intersection, a railroad crossing, or the like, and action planning based on behavior prediction of other vehicles, for example. The driving control unit 205 controls a driving force output device 212, a steering device 213, and a brake device 214 based on the action plan made by the action planning unit 204. Here, the driving force output device 212 corresponds to the power plant 6 in FIG. 1, the steering device 213 corresponds to the electric power steering apparatus 3 in FIG. 1, and the brake device 214 corresponds to the braking apparatus 10, for example.

The device control unit 206 controls devices that are connected to the controller 200. For example, the device control unit 206 controls a speaker 215, and causes the speaker 215 to output a predetermined voice message such as a warning or a message for navigation. Also, the device control unit 206 controls a display device 216, and causes the display device 216 to display a predetermined interface, for example. The display device 216 corresponds to the display apparatus 92, for example. Also, the device control unit 206 controls the navigation device 217, and acquires information set in the navigation device 217, for example.

The controller 200 may appropriately include functional blocks other than those shown in FIG. 2, and may include an optimum route calculation part that calculates an optimum route to the destination based on map information acquired via the communication apparatus 24c, for example. Also, the controller 200 may acquire information from devices other than the cameras and sensors shown in FIG. 2, and may acquire information regarding another vehicle via the communication apparatus 25a, for example. Also, the controller 200 receives detection signals from various sensors provided in the vehicle 1 in addition to the GPS sensor 211. For example, the controller 200 receives detection signals of door open/close sensors and doorlock mechanism sensors that are provided at doors of the vehicle 1 via ECUs installed at the doors. With this, the controller 200 can detect canceling of the doorlocks and opening/closing operations of the doors.

Figure 3:
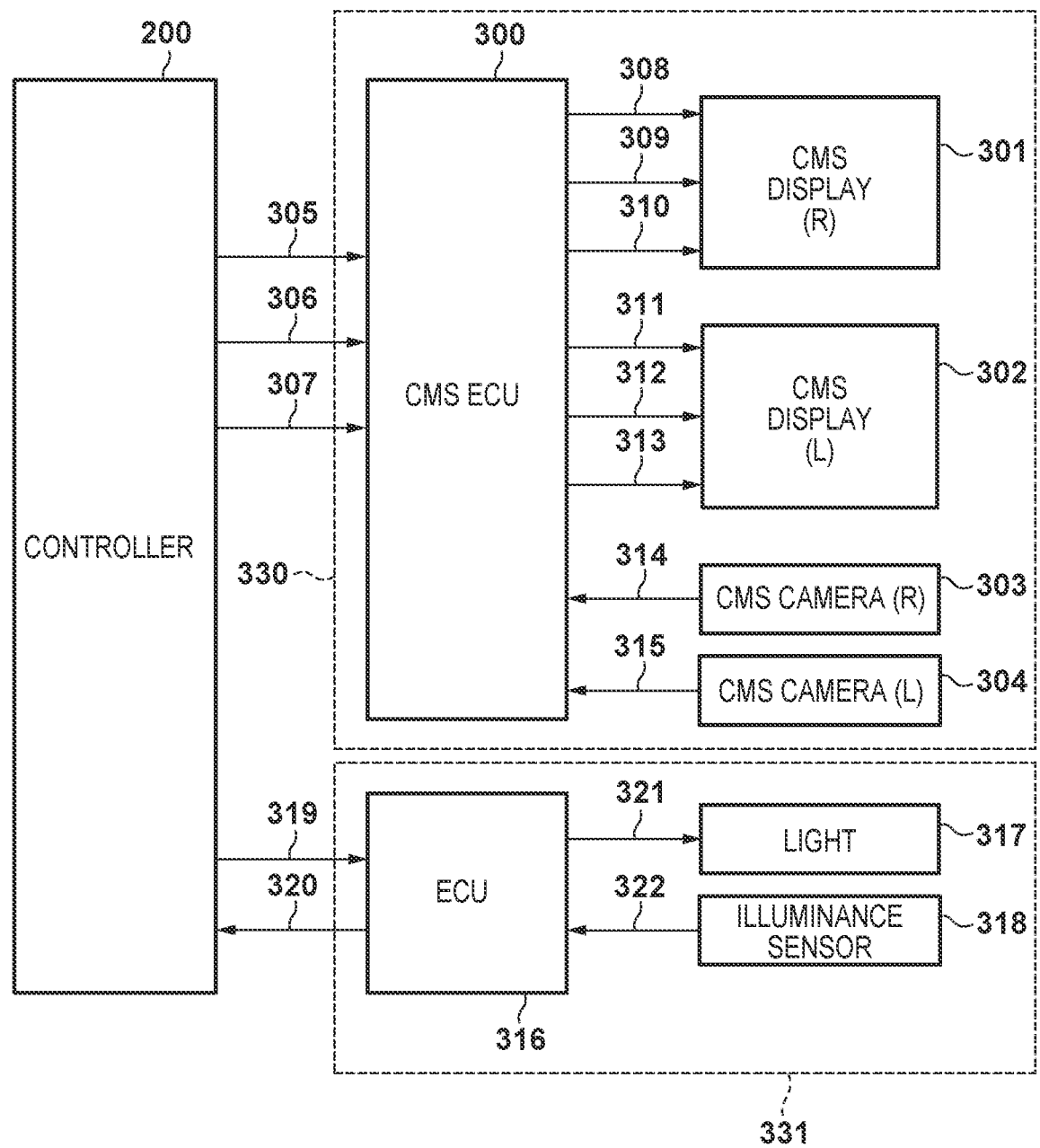
FIG. 3 is a diagram illustrating a connection configuration between a controller and a CMS and an automated lighting system.
Figure 4:
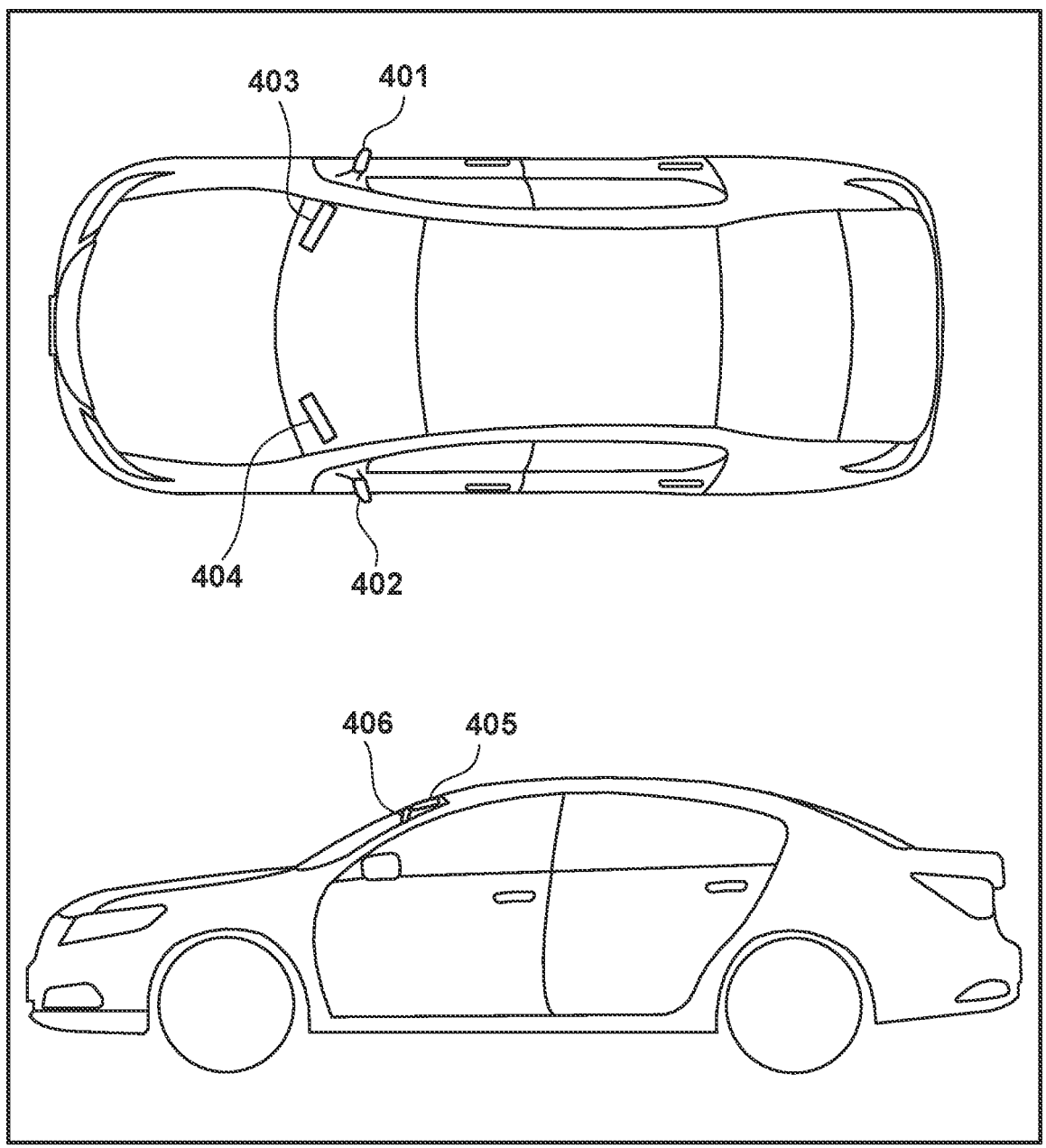
FIG. 4 is a diagram illustrating installation positions of cameras, displays, and illuminance sensors.

Also, a camera monitoring system (CMS, peripheral monitoring system) and an automated lighting system are connected to the controller 200. FIG. 3 is a diagram illustrating the configuration of a display system including the controller 200, a CMS 330 and an automated lighting system 331. In the present embodiment, the vehicle 1 is a so-called door mirror-less vehicle in which cameras that capture images rearward of the vehicle 1 is provided in place of the door mirrors. As shown in FIG. 4, cameras 401 and 402 are installed at positions of door mirrors of the vehicle 1. The camera 401 is a camera that captures an image right rearward of the vehicle 1, and the rearward image captured by the camera 401 is displayed in the display 403. Also, the camera 402 is a camera that captures an image left rearward of the vehicle 1, and the rearward image captured by the camera 402 is displayed in the display 404.

The CMS 330 includes a CMS-ECU 300, a CMS display 301, a CMS display 302, a CMS camera 303, and a CMS camera 304. The CMS camera 303 corresponds to the camera 401 in FIG. 4, and the CMS camera 304 corresponds to the camera 402 in FIG. 4. Also, the CMS display 301 corresponds to the display 403 in FIG. 4, and the CMS display 302 corresponds to the display 404 in FIG. 4. Note that, in the present embodiment, the images displayed in the CMS displays 301 and 302 are illustrated as being generated from image data obtained by capturing that is performed by the cameras 401 and 402, but the image data may be image data obtained by capturing performed by another camera. For example, the image data may be image data obtained by capturing performed by a rearview camera.

The CMS-ECU 300 integrally control the CMS 330 under the control of the controller 200. The CMS 330 receives a forward illuminance signal 305, an upper illuminance signal 306, and a brightness signal 307 from the controller 200. The forward illuminance signal 305 and upper illuminance signal 306 correspond to illuminance signals detected by later-described illuminance sensors 318. The brightness signal 307 is a signal for controlling the brightness of the CMS displays 301 and 302.

The CMS-ECU 300 receives an imaging signal 314 generated by capturing performed by the CMS camera 303 from the CMS camera 303, converts the signal to display rendering data, and transmits the display rendering data to the CMS display 301 as image capturing data 308. Also, the CMS-ECU 300 receives an imaging signal 315 generated by capturing performed by the CMS camera 304 from the CMS camera 304, converts the signal to display rendering data, and transmits the display rendering data to the CMS display 302 as image capturing data 311. Also, the CMS-ECU 300 controls the brightness of the CMS display 301 by transmitting a brightness signal 309 and a brightness control signal 310 that is used to control the change in brightness and the like to the CMS display 301. Also, the CMS-ECU 300 controls the brightness of the CMS display 302 by transmitting a brightness signal 312 and a brightness control signal 313 that is used to control the change in brightness and the like to the CMS display 302.

The automated lighting system 331 includes an ECU 316, lights 317, and illuminance sensors 318. The lights 317 are a headlight and a taillight, for example. Also, the illuminance sensors 318 are sensors for detecting the peripheral illuminance of the vehicle 1. In the present embodiment, the illuminance sensors 318 include an upper illuminance sensor 405 and a forward illuminance sensor 406. As shown in FIG. 4, the upper illuminance sensor 405 is installed on an interior side of the front window behind a rearview mirror, and detects upper illuminance of the vehicle 1. Also, the forward illuminance sensor 406 is installed on the interior side of the front window behind the rearview mirror, and detects forward illuminance of the vehicle 1.

The ECU 316 integrally controls the automated lighting system 331 under the control of the controller 200. When the peripheral illuminance of the vehicle 1 has decreased to a threshold value or less, the automated lighting system 331 automatically turns on the headlight. The ECU 316 receives the upper illuminance and forward illuminance detected by the illuminance sensors 318 from the illuminance sensors 318 as illuminance signals 322, and controls the light amounts of the lights 317 using control signals 321. Also, the ECU 316 includes the illuminance signals 322 from the illuminance sensors 318 in a signal 320, and transmits the signal 320 to the controller 200. The controller 200 recognizes the upper illuminance detected by the upper illuminance sensor 405 and the forward illuminance detected by the forward illuminance sensor 406 based on the signal 320, and transmits the recognized illuminance to the CMS-ECU 300 as the forward illuminance signal 305 and the upper illuminance signal 306.

The controller 200 performs various types of control on the ECU 316 using a control signal 319. For example, when an ON/OFF setting or the like of the automatic lighting function is received from the driver via the display device 216, the controller 200 controls the ECU 316 using the control signal 319. Also, when the automatic lighting function is OFF, the controller 200 can also instruct the control amounts of light amounts of the lights 317 to the ECU 316 using the control signal 319.

Image Display Processing in CMS Mode

Next, the image display processing according to the CMS mode will be described with reference to FIGS. 5 to 7B.

Figure 5:
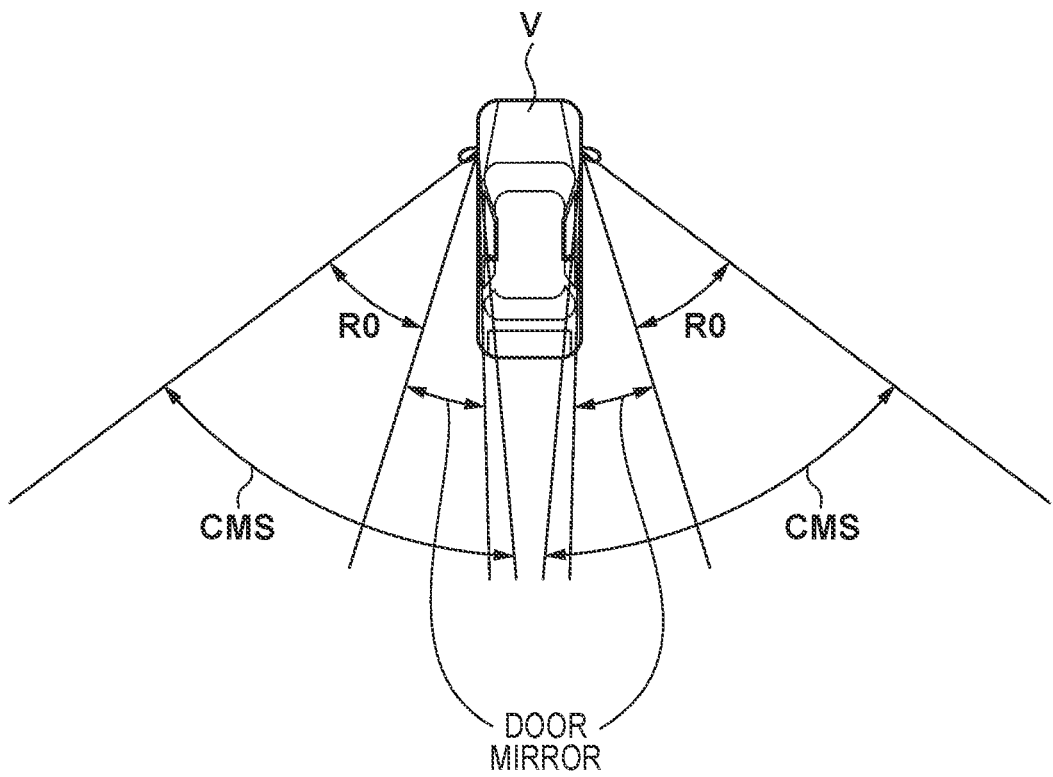
FIG. 5 is a diagram illustrating and comparing the field of view range between the CMS and door mirrors.

FIG. 5 is a diagram illustrating ranges (shooting angles of view) that can be shot by the CMS cameras 303 and 304 of the present embodiment. As shown in the CMS ranges in FIG. 5, the regions R0, which are in blind angles in the known door mirrors, can be included in the field of view ranges of the CMS cameras 303 and 304.

The CMS-ECU 300 cuts out image data for performing display in the left and right CMS displays 301 and 302 from image data corresponding to the shooting ranges shot by the left and right CMS cameras 303 and 304, and creates CMS images by performing compression/reduction with respect to images of some regions included in the image data, and displays the created images in the CMS displays 301 and 302.

Mirror View Mode

Figure 6A:
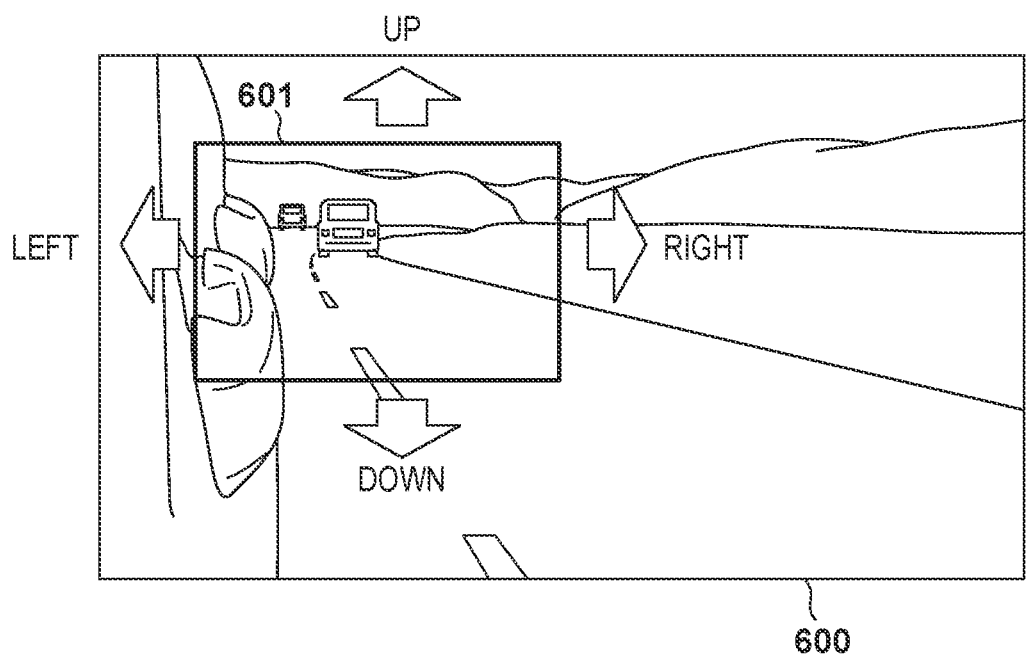
FIGS. 6A and 6B are diagrams illustrating a display image in a mirror view mode.
Figure 6B:
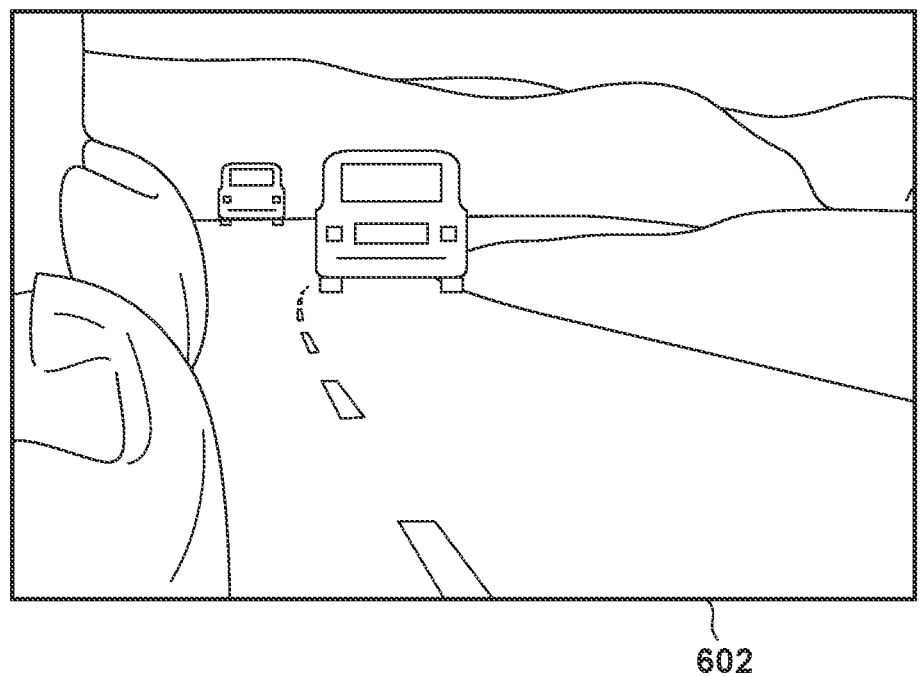

FIGS. 6A and 6B are diagrams illustrating an exemplary shot image 600 of the CMS camera when the CMS mode is the mirror view mode and an exemplary output image (CMS image) 602 of the CMS display in the present embodiment. Note that, in FIGS. 6A and 6B, an example of the right side CMS camera and CMS display is shown, but the left side CMS camera and CMS display similarly operate, and the images shot by the left and right CMS cameras 303 and 304 are symmetrically displayed in the left and right CMS displays 301 and 302.

In the mirror view mode, as shown in FIG. 6A, the CMS-ECU 300 cuts out a region 601 according to the size of the display region of the CMS display 301 from image data of the shot image 600 obtained by shooting performed by the CMS camera 303, and creates a CMS image by resizing the region 601 so as to match the size of the display region of the CMS display 301. A CMS image 602 created by the CMS-ECU 300 is displayed in the entirety of the display region of the CMS display 301. Although not illustrated, a display region (statutory area) in which a predetermined statutory field of view is defined by regulations or the like is set, in advance, in the CMS image 602. The predetermined statutory field of view is a region that should be visible from a driver during driving, which is stipulated in regulations defined by the United Nations Economic Commission for Europe, and corresponds to the field of view that is defined in Chapter II, Section 15 of UN/ECE-R46, for example. Also, the driver's line of sight, which serves as the reference, is defined based on "The driver's ocular points" in Chapter II, Section 12 of ECE/TRANS/WP.29/2015/84, https://www.unece.org/trans/main/wp29/wp29wgs/wp29gen/gen2015.html. Also, in the CMS image 602, an icon indicating that being in the mirror view mode, icons indicating conditions such as field of view being under adjustment, field of view being unadjustable, and anomalous screen (at high temperature or low temperature) are displayed as necessary. Also, guide lines serving as indices indicating a guide of distances sideward and rearward of the self-vehicle may be displayed.

Angle of View Adjustment Processing

The user can horizontally and vertically move the position (display range) of an image displayed in the display region of the CMS display 301 by operating a four-directional button of a CMS switch provided in the display device 216, similarly to the known door mirrors, and the user (such as a driver or a passenger) can adjust to a desired field of view range. The user can select one of the left and right CMS displays 301 and 302 as the display to be adjusted by setting a display selection switch of a CMS switch to one of left and right, and can horizontally and vertically move the field of view range of a CMS image in the CMS display 301 or 302 that has been selected as the display to be adjusted by pressing the four-directional button. The CMS-ECU 300 creates a CMS image 602 corresponding to a cutout region 601 that is set using the four-directional button of the CMS switch, from an image shot by the CMS camera 303, and displays the CMS image 602 in the display region of the CMS display 301.

Wide-Angle View Mode

Figure 7A:
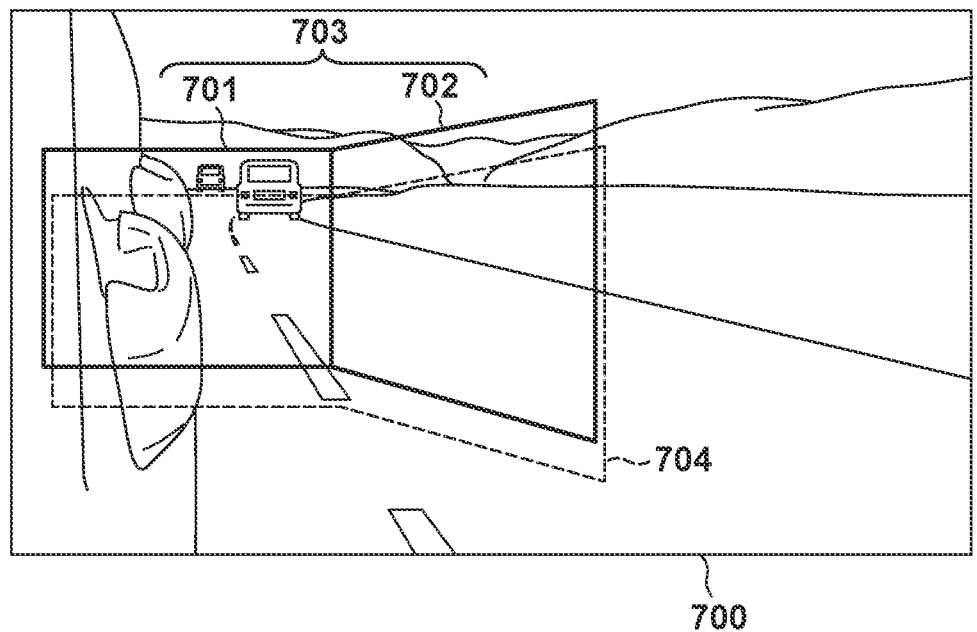
FIGS. 7A and 7B are diagrams illustrating a display image in a wide-angle view mode.
Figure 7B:
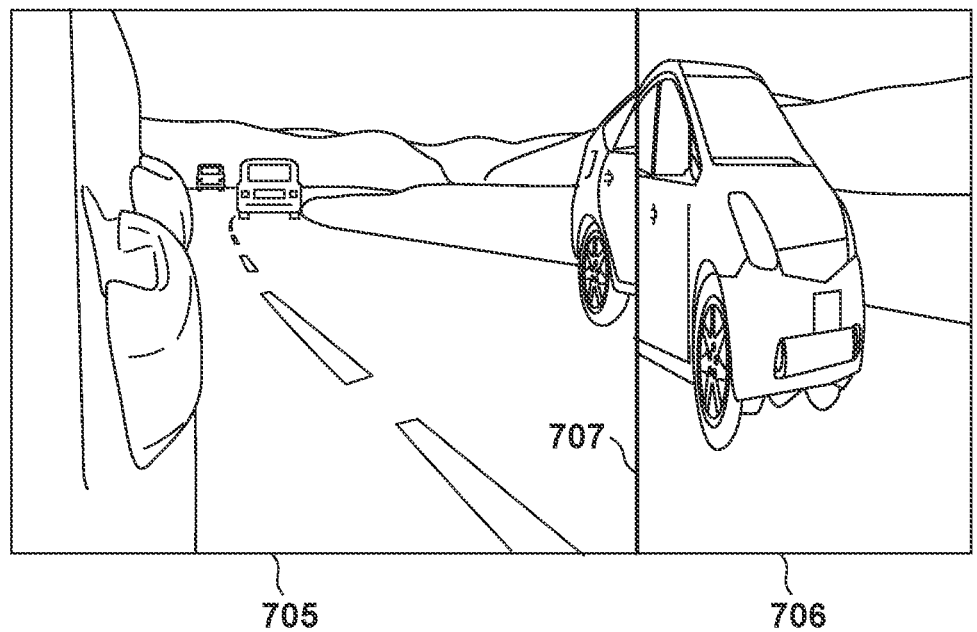

FIGS. 7A and 7B are diagrams illustrating an exemplary shot image of the CMS camera when the CMS mode is a wide-angle view mode and an exemplary output image (CMS image) of the CMS display, in the present embodiment. Note that, in FIGS. 7A and 7B, an example of the right side CMS camera and CMS display is shown, but the left side CMS camera and CMS display similarly operate, and the images shot by the left and right CMS cameras 303 and 304 are symmetrically displayed in the left and right CMS displays 301 and 302.

In the wide-angle view mode, as shown in FIG. 7A, the CMS-ECU 300 cuts out a region 703 according to the size of the display region of the CMS display 301 from image data 700 obtained by shooting performed by the CMS camera 303, and creates a CMS image by resizing the region 703 so as to match the size of the display region of the CMS display 301. The cutout region 703 includes a rectangular first cutout region 701 for cutting out a mirror view image (narrow-angle image) and a trapezoidal second cutout region 702 for cutting out a wide-angle image, and a CMS image corresponding to the first cutout region 701 and a CMS image corresponding to the second cutout region 702 that are created by the CMS-ECU 300 are displayed in the display region of the CMS display 301.

The display region of the CMS display 301 is divided into a mirror view region 705 in which the CMS image corresponding to the first cutout region 701 is displayed and a wide-angle view region 706 in which the CMS image corresponding to the second cutout region 702 is displayed, as shown in FIG. 7B. Note that FIGS. 7A and 7B do not show images shot at the same time. A vehicle, which is not shown in FIG. 7A, is displayed in FIG. 7B in order to illustrate an effect of the wide-angle view mode.

The CMS-ECU 300 creates a mirror view image obtained by resizing an image shot by the CMS camera 303 so as to match the size of the mirror view region 705, and a wide-angle view image obtained by resizing the image according to the wide-angle view region 706. The mirror view image is displayed in the mirror view region 705 of the CMS display 301, and the wide-angle view image is displayed in the wide-angle view region 706 of the CMS display 301. The wide-angle view image is a wide-angle image obtained by compressing/reducing an image corresponding to image data cut out from the image data, which is obtained by shooting performed by the CMS camera 301, according to the second cutout region 702 corresponding to the wide-angle view region 706 of the CMS display 301 so as to match the shape/size of the wide-angle view region 706, and has magnification different from that of the mirror view image. The following methods may be used to differentiate the magnification of the mirror view region 705 from the magnification of the wide-angle view region 706. For example, a uniform magnification A may set inside the mirror view region 705 regardless of the position inside the region, and a uniform magnification B may be set inside the wide-angle view region 706 regardless of the position inside the region. Also, a configuration may be such that a uniform magnification is set inside the mirror view region 705 regardless of the position inside the region, and meanwhile, the magnification, in the wide-angle view region 706, changes according to the position inside the region. In this case, the magnification inside the wide-angle view region 706 is set such that the magnification is the magnification A in the vicinity of the boundary with the mirror view region 705, and changes from the magnification A so as to approach the magnification B as separating from the boundary, and is the magnification B at positions farthest from the boundary, for example. In the case, the magnification may be set so as to linearly change from the magnification A to the magnification B, or may be set so as to nonlinearly change.

The mirror view region 705 is provided at a position (inner side of vehicle width) closer to the center of the self-vehicle in the display region of the CMS display 301, and the wide-angle view region 706 is provided at a position (outer side of vehicle width) farther from the center of the self-vehicle in the display region of the CMS display 301. The mirror view region 705 and the wide-angle view region 706 are provided adjacent to each other in the display region of the CMS display 301. Also, the statutory area described above is set in the mirror view region 705.

Note that the display mode of the CMS display is not limited to the mode in which the display region is divided into two regions, and may be divided into three or more regions on the condition that the statutory area is secured.

Also, a parting line 707 is displayed so as to be distinguishable in a boundary portion between the mirror view region 705 and the wide-angle view region 706 in the display region of the CMS display 301. With this, the user can recognize that the wide-angle view image is an image whose magnification is different from that of the mirror view image, and misrecognition of an object that is present sideward of the self-vehicle can be prevented.

Also, an icon display region, in which a wide-angle view icon indicating that being in the wide-angle view mode is to be displayed, is provided in the display region of the CMS display 301. The wide-angle view icon is superimposed on a mirror view image in the mirror view region 705 by the CMS-ECU 300, and is displayed during a predetermined time (3 seconds, for example) when the mode has been switched. The icon display region is arranged in an upper portion of a side end portion, of the display region of the CMS display 301, that overlaps the self-vehicle in order to be at a position not overlapping the statutory area and not shield objects in the mirror view image. Note that icons indicating conditions such as field of view being under adjustment, field of view being unadjustable, and anomalous screen (at high temperature or low temperature) other than the wide-angle view icon are displayed in the icon display region as necessary.

Next, switching between the wide-angle view mode and the mirror view mode in the present embodiment will be described. As described above, in the mirror view mode, a user (such as a driver) can adjust the field of view range to the desired range in multistages (ten stages, for example) by horizontally and vertically moving the position of an image displayed in the display region of the CMS display 301. On the other hand, in the wide-angle view mode, although the user can adjust the position of an image displayed in the display region of the CMS display 301, the adjustment amount is greatly limited relative to the mirror view mode. The dotted-line region 704 in FIG. 7A is a region including the adjusted first cutout region 701 and second cutout region 702. As shown in FIG. 7A, in the wide-angle view mode, adjustment in only two stages is possible, namely the solid-line default region 703 including the first cutout region 701 and the second cutout region 702 and the adjusted dotted-line region 704. Note that in FIG. 7A, although the dotted-line region 704 is displayed by being shifted in a horizontal direction by a small amount for the sake of description, in actuality, a manner in which the dotted-line region 704 is obtained by performing adjustment in only a vertical direction with respect to the default region 703 is illustrated. In the above description, ten stages is given as an example of the number of adjustable stages in the mirror view mode, and two stages is given as an example of the number of adjustable stages in the wide-angle view mode. But, the numbers of stages are not limited thereto, as long as the relationship "the number of adjustable stages in the mirror view mode≥ the number of adjustable stages in the wide-angle view mode" is satisfied. For example, the numbers of adjustable stages in the mirror view mode and the wide-angle view mode may be larger than ten and two, respectively, or may be smaller than ten and two, respectively. Also, in the above description, the adjustable range is illustrated by the number of stages, but the position can be continuously adjusted in the adjustable range. In this case, the relationship "adjustable adjustment amount in the mirror view mode≥adjustable adjustment amount in the wide-angle view mode" holds. Also, as indicated by the above relational expressions, the number of adjustable stages (adjustment amount) in the wide-angle view mode may be the same as the number of adjustable stages (adjustment amount) in the mirror view mode.

Figure 8:
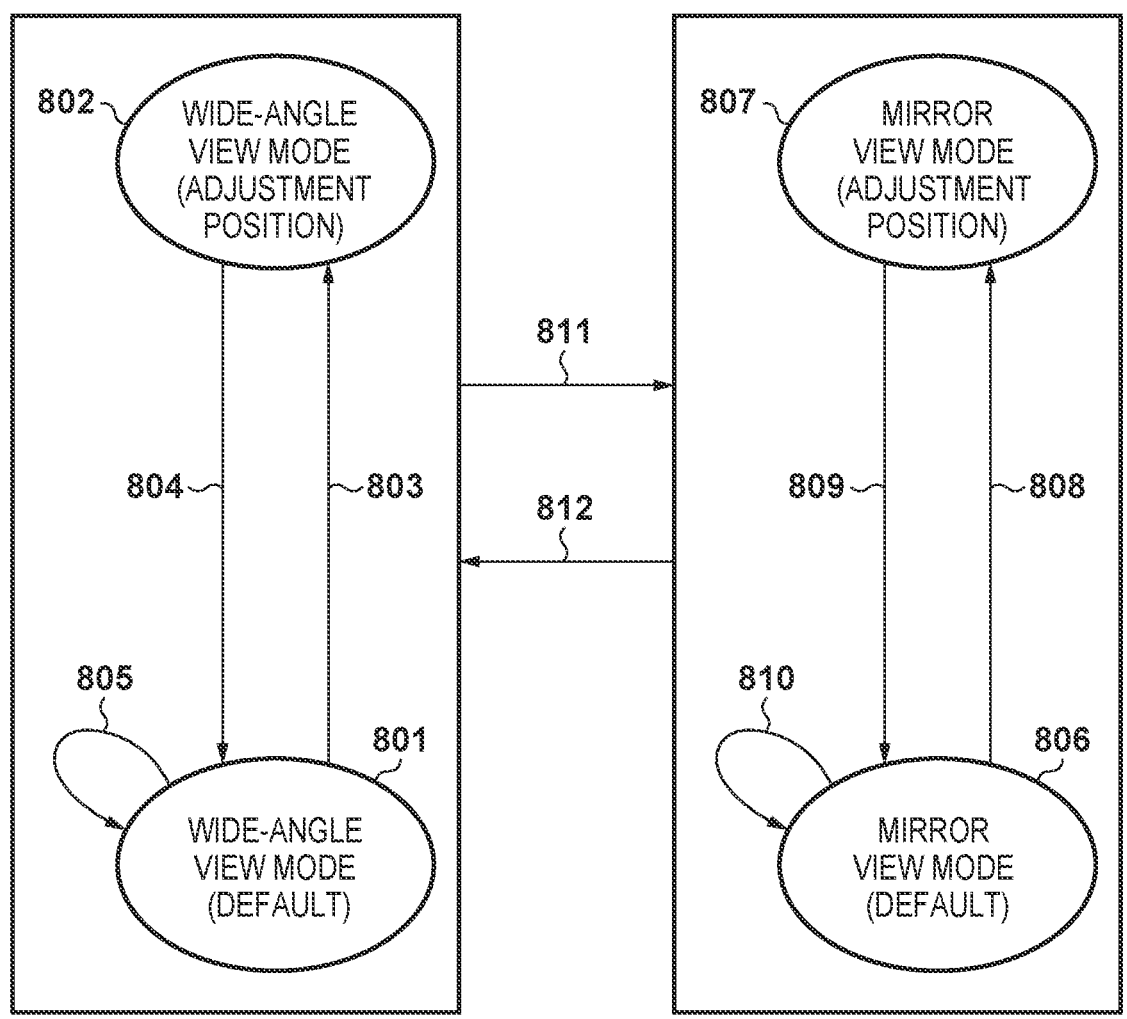
FIG. 8 is a diagram illustrating the transition in each of the mirror view mode and the wide-angle view mode, and the transition between the two modes.

FIG. 8 is a diagram illustrating the transition in each of the display modes, namely the mirror view mode and the wide-angle view mode, and the transition between the two modes. A mirror view mode 806 in FIG. 8 indicates a mirror view mode when images displayed in the display regions are at the default positions. When the user horizontally and vertically moves the field of view range in the CMS image in this state, the mode transitions from the mirror view mode 806 to a mirror view mode 807 (transition 808). In the mirror view mode 807, if the user long-presses a predetermined direction button of the CMS switch (5 seconds, for example), for example, the mode is reset to the mirror view mode 806 (transition 809). Similarly, in the mirror view mode 806, if the user long-presses the predetermined direction button of the CMS switch as well, the mode is reset to the mirror view mode 806 (transition 810).

In the mirror view mode 806 or the mirror view mode 807, upon receiving a user instruction for mode switching made by the CMS switch, the mode transitions to the wide-angle view mode (transition 812).

The wide-angle view mode 801 indicates a wide-angle view mode when the images displayed in the display regions are images located in the default regions 703. When the user adjusts the field of view range of the CMS image in this state, the mode transitions from the wide-angle view mode 801 to the wide-angle view mode 802 (transition 803). In the wide-angle view mode 802, if the user long-presses a predetermined direction button of the CMS switch (5 seconds, for example), for example, the mode is reset to the wide-angle view mode 801 (transition 804). Similarly, in the wide-angle view mode 801, if the user long-presses the predetermined direction button of the CMS switch as well, the mode is reset to the wide-angle view mode 801 (transition 805).

In the wide-angle view mode 801 or wide-angle view mode 802, upon receiving a user instruction for mode switching made by the CMS switch, the mode transitions to the mirror view mode (transition 811).

Hereinafter, the switching (transitioning) from the mirror view mode to the wide-angle view mode in the present embodiment will be described.

Figure 9:
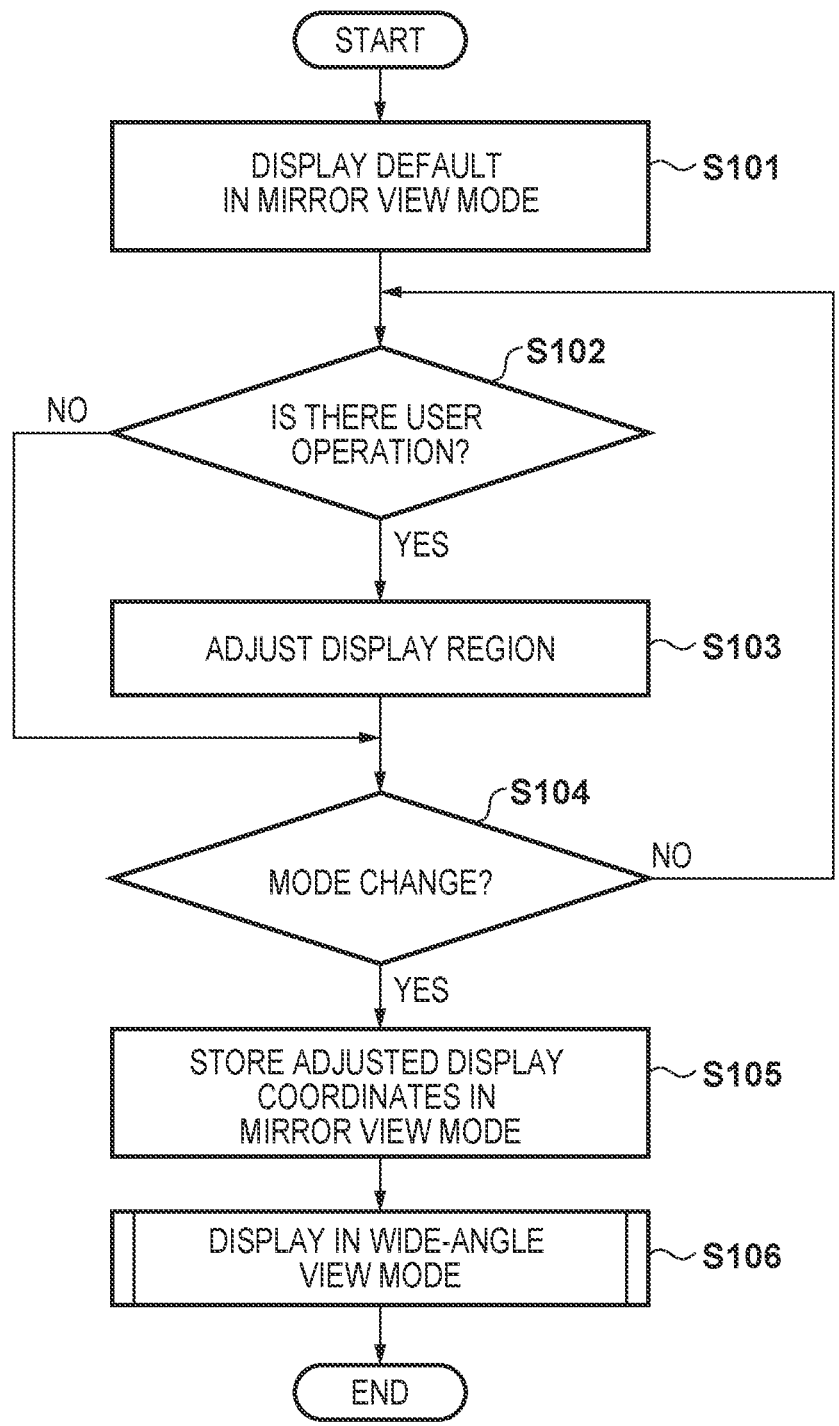
FIG. 9 is a flowchart illustrating processing when switching is performed from the mirror view mode to the wide-angle view mode.

FIG. 9 is a flowchart illustrating processing when switching is performed from the mirror view mode to the wide-angle view mode, in the present embodiment. The processing in FIG. 9 is realized by the CMS-ECU 300 reading out a program stored in a storage region such as a ROM and executing the program, for example. Alternatively, the processing in FIG. 9 may be executed by the controller 200. The processing in FIG. 9 is started when the CMS 330 is activated.

In step S101, the CMS-ECU 300 displays CMS images at the default positions in the mirror view mode. This state corresponds to the mirror view mode 806 in FIG. 8. In step S102, the CMS-ECU 300 determines whether or not a user operation for adjusting the field of view range of the CMS image has been received. Here, upon determining that the user operation has been received, in step S103, the CMS-ECU 300 adjusts the display region following the user operation. Thereafter, in step S104, the CMS-ECU 300 determines whether or not an instruction to switch to the wide-angle view mode has been received. On the other hand, upon determining that a user operation has not been received in step S102, processing for determining whether or not an instruction to switch to the wide-angle view mode has been received is executed in step S104.

Upon determining that an instruction to switch to the wide-angle view mode has not been received in step S104, the processing from step S102 is repeated. On the other hand, upon determining that an instruction to switch to the wide-angle view mode has been received, in step S105, the CMS-ECU 300 stores the coordinates of the adjusted display region in the mirror view mode. Here, the coordinates to be stored are coordinates corresponding to the position adjusted in step S103. Also, following the designation made by the user, the processing in step S105 may be executed or not be executed. Thereafter, in step S106, the CMS-ECU 300 performs display in the wide-angle view mode. The processing in step S106 will be described later. After step S106, the processing in FIG. 9 is ended.

Figure 10:
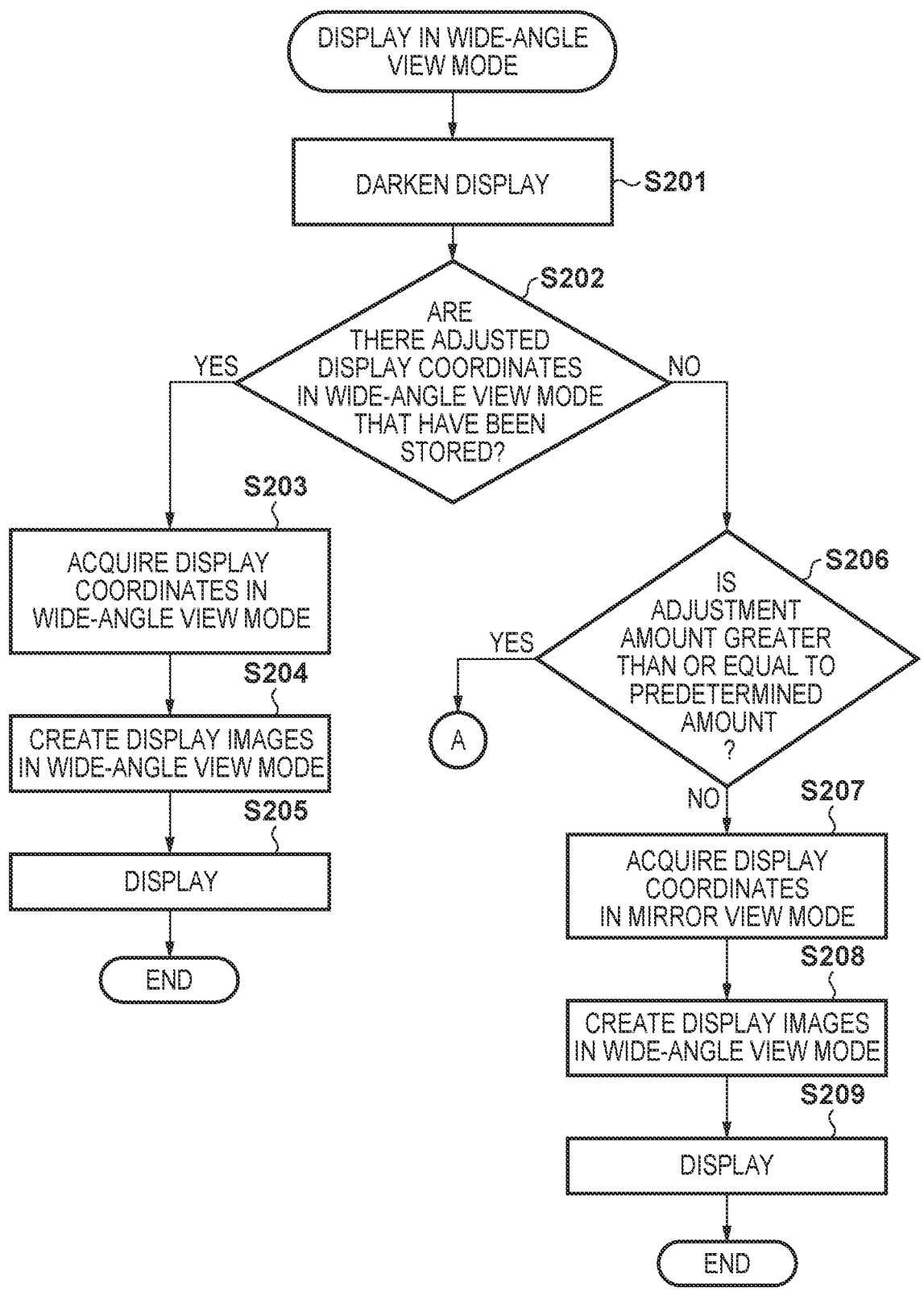
FIG. 10 is a flowchart illustrating processing in step S106 in FIG. 9.

FIG. 10 is a flowchart illustrating the processing in step S106 in FIG. 9. In step S201, the CMS-ECU 300 darkens the display of the CMS displays 301 and 302. In step S202, the CMS-ECU 300 determines whether or not display coordinates after adjustment in the wide-angle view mode are stored. Note that the processing may be started from step S202 without performing the processing in step S201. When the processing in step S201 is performed, after the screens are darkened, images are displayed in step S205 or step S209. On the other hand, when the processing in step S201 is not performed, an expanding or contracting image is displayed in step S205 or step S209 without the screen having been darkened.

In the following, a case where it has been determined, in step S202, that display coordinates after adjustment in the wide-angle view mode are not stored will be described. The case where it has been determined, in step S202, that display coordinates after adjustment in the wide-angle view mode are stored will be described later in FIG. 12. In step S206, the CMS-ECU 300 determines whether or not the adjustment amount of the display region in step S103 is greater than or equal to a predetermined amount.

Figure 15:
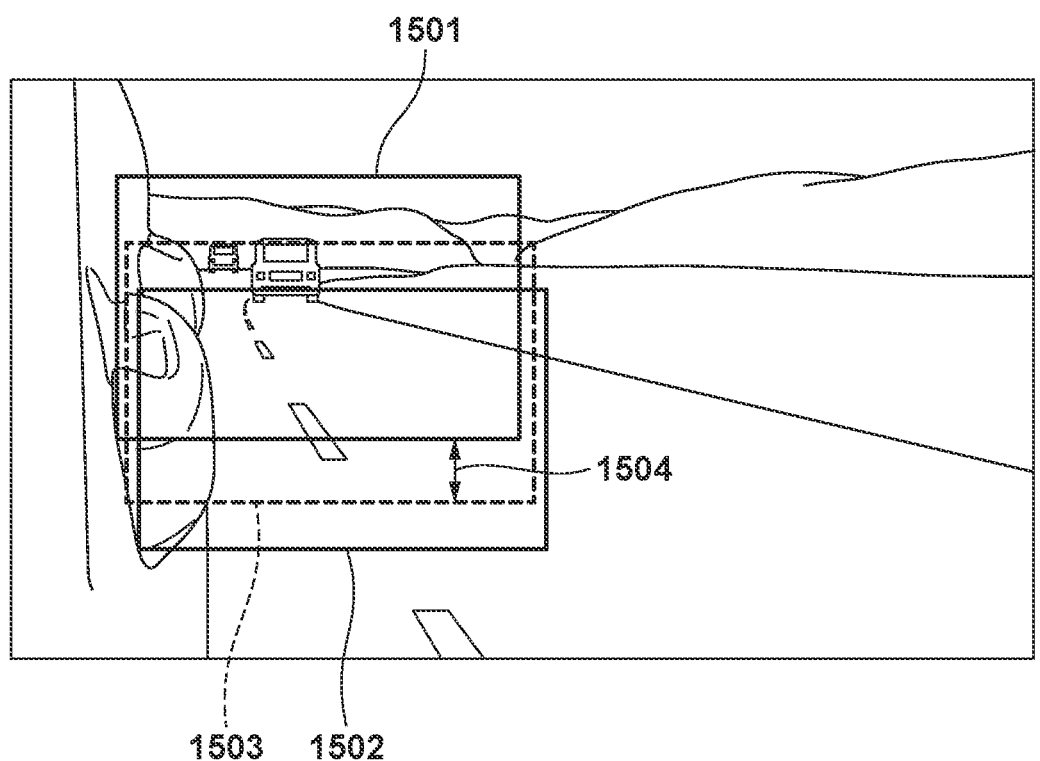
FIG. 15 is a diagram illustrating a threshold value of the adjustment amount in the mirror view mode.

Here, the adjustment amount of the display region will be described with reference to FIG. 15. The region 1501 in FIG. 15 indicates a default position of the region 601 in the mirror view mode. Also, the region 1502 indicates a region after the user has adjusted the field of view range. Also, the region 1503 is a region corresponding to the predetermined amount of the adjustment amount, which is used in the determination in step S206, and the difference 1504 indicates the predetermined amount. Note that in FIG. 15, although the regions 1501, 1502, and 1503 are displayed by being shifted in a horizontal direction by a small amount for the sake of description, in actuality, a manner in which the regions 1502 and 1503 are obtained by performing adjustment in only a vertical direction with respect to the region 1501 is illustrated. Therefore, the difference 1504 indicates the difference in coordinate in the vertical direction. If the result of adjustment made in step S103 is the region 1502 in FIG. 15, because the adjustment amount of the region 1502 from the region 1501 is greater than or equal to the difference 1504, in step S206, it is determined that the adjustment amount is greater than or equal to the predetermined amount.

As described in FIGS. 7A and 7B, the adjustable amount in the wide-angle view mode is greatly limited relative to the adjustable amount in the mirror view mode. Moreover, in the wide-angle view mode, a trapezoidal region needs to be cut out so as to be adjacent to the first cutout region 701, similarly to the second cutout region 702 in FIG. 7A, therefore there may be cases where the trapezoidal region cannot be cut out from image data obtained by shooting made by the CMS camera depending on the adjustment result in the mirror view mode. Therefore, in the present embodiment, the predetermined amount is set as the threshold value (limiting value) in order to make the cutting out from the image data for the wide-angle view mode possible.

Figure 11:
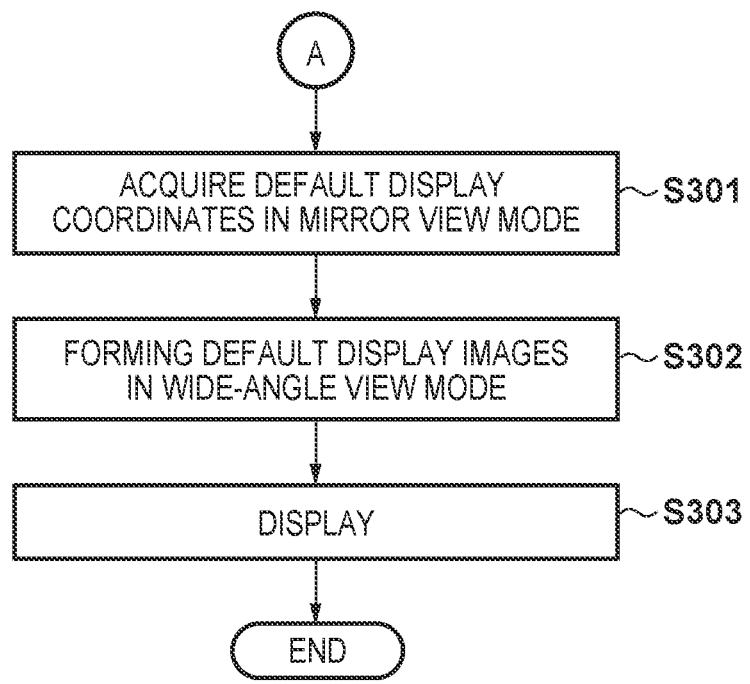
FIG. 11 is a flowchart illustrating processing in step S106 in FIG. 9.

If it has been determined, in step S206, that the adjustment amount is greater than or equal to the predetermined amount, it is judged that switching to the wide-angle view mode is not possible with the adjustment amount of the display region indicated in step S103, and the processing in FIG. 11 is performed. The processing in FIG. 11 will be described later. On the other hand, if it has been determined, in step S206, that the adjustment amount is less than the predetermined amount, it is judged that switching to the wide-angle view mode is possible based on the adjustment amount of the display region indicated in step S103, and the processing is advanced to step S207.

In step S207, the CMS-ECU 300 acquires the coordinates of the display region(s) adjusted in step S103. For example, the CMS-ECU 300 may acquire the display coordinates in the mirror view mode that have been stored in step S105. Note that the processing in step S207 need not be performed. For example, if the CMS-ECU 300 can acquire the coordinates at any time as a result of the coordinates having being stored in step S105, the processing may be advanced to step S208 from step S206 without performing the processing in step S207.

In step S208, the CMS-ECU 300 creates display images in the wide-angle view mode based on the display coordinates in the mirror view mode that have been acquired in step S207. For example, the CMS-ECU 300 specifies, in image data obtained by capturing performed by the CMS cameras 303 and 304, first cutout regions 701 in the wide-angle view mode corresponding to the display coordinates in the mirror view mode, and creates CMS images corresponding to the image data of the specified first cutout regions 701. Also, the CMS-ECU 300 specifies second cutout regions 702, in the wide-angle view mode, adjacent to the first cutout regions 701, and creates CMS images by compressing/reducing images corresponding to the image data of the specified second cutout regions 702 so as to match the shape/size of the wide-angle view regions. In step S209, the CMS-ECU 300 displays the display images, in the wide-angle view mode, created in step S208 in the CMS displays 301 and 302. After step S209, the processing in FIG. 10 is ended.

FIG. 11 is a flowchart illustrating the processing when it has been determined that the adjustment amount is greater than or equal to the predetermined amount in step S206. In step S301, the CMS-ECU 300 acquires default display coordinates in the mirror view mode. For example, the default display coordinates in the mirror view mode are of the regions 601 at the default positions, and may be set by the system in advance and stored in a storage region such as a R0M. Note that the processing in step S301 need not be performed. The mode is the mirror view mode until the processing in step S303 is executed, and therefore, if the CMS-ECU 300 recognizes the default display coordinates in the mirror view mode, for example, the processing in FIG. 11 may be started from step S302 without performing the processing in step S301.

In step S302, the CMS-ECU 300 creates default display images in the wide-angle view mode based on the default display coordinates in the mirror view mode that have been acquired in step S301. For example, the CMS-ECU 300 specifies, in image data obtained by capturing performed by the CMS cameras 303 and 304, first cutout regions 701 in the wide-angle view mode corresponding to the default display coordinates in the mirror view mode, and creates CMS images corresponding to the image data of the specified first cutout regions 701. Also, the CMS-ECU 300 specifies second cutout regions 702, in the wide-angle view mode, adjacent to the first cutout regions 701, and creates CMS images by compressing/reducing images corresponding to the image data of the specified second cutout regions 702 so as to match the shape/size of the wide-angle view regions. In step S303, the CMS-ECU 300 displays the display images, in the wide-angle view mode, created in step S302 in the CMS displays 301 and 302. After step S303, the processing in FIG. 11 is ended.

In this way, in the present embodiment, when the mode is switched from the mirror view mode to the wide-angle view mode, when the display coordinates after adjustment in the wide-angle view mode are not stored, if the display region has been adjusted by the user operation in the mirror view mode, a display image in the wide-angle view mode is displayed based on the adjustment result. With such a configuration, the user need not adjust the field of view range after switching to the wide-angle view mode, and the convenience can be improved.

Figure 12:
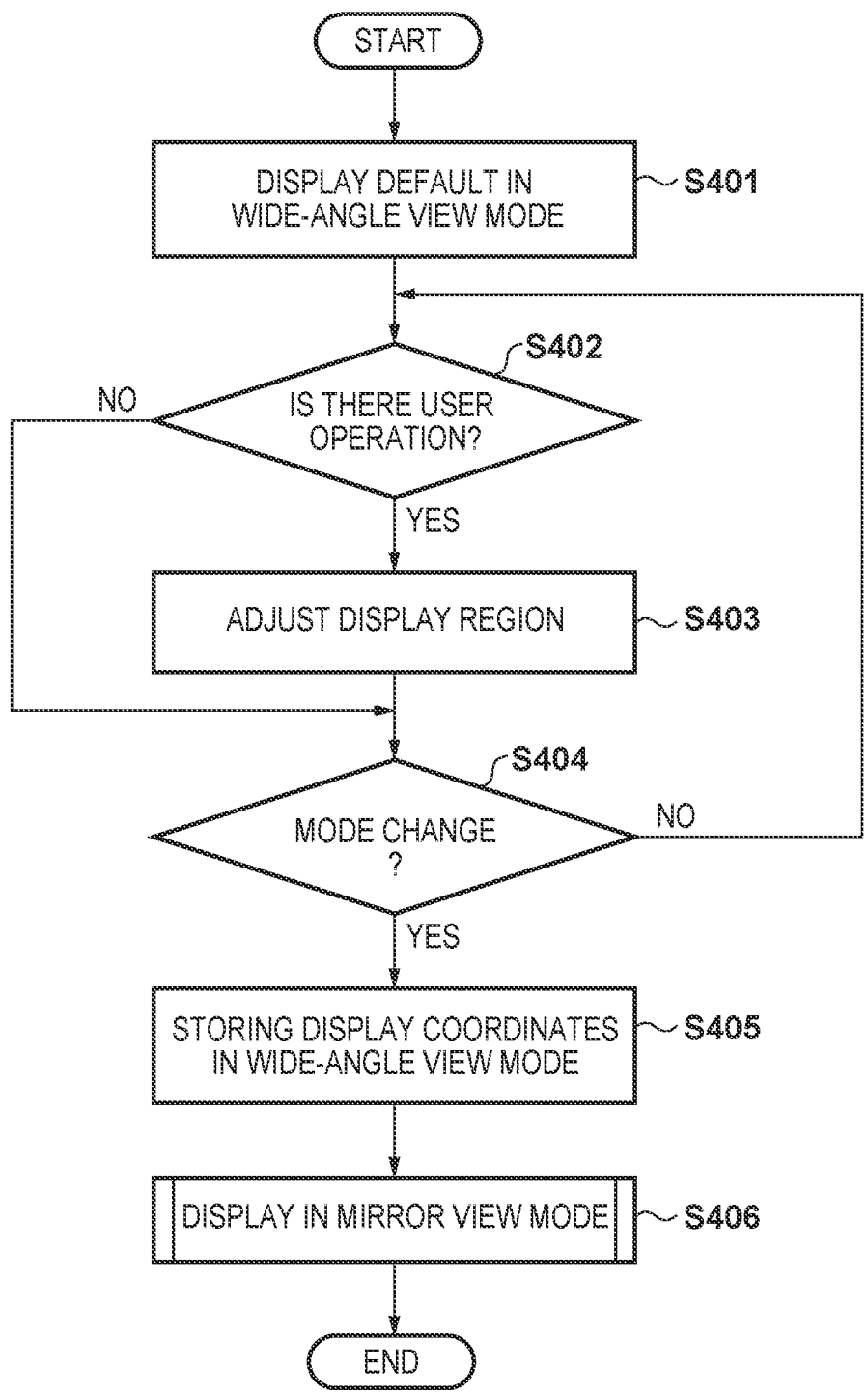
FIG. 12 is a flowchart illustrating processing when switching is performed from the wide-angle view mode to the mirror view mode.

FIG. 12 is a flowchart illustrating the processing when the mode is switched from the wide-angle view mode to the mirror view mode in the present embodiment. The processing in FIG. 12 is realized by the CMS-ECU 300 reading out a program stored in a storage region such as a R0M and executing the program, for example. Alternatively, the processing in FIG. 12 may be executed by the controller 200. The processing in FIG. 12 is started when the mode has been switched from the mirror view mode to the wide-angle view mode, and wide-angle view images are displayed in the CMS displays 301 and 302.

In step S401, the CMS-ECU 300 displays CMS images at the default positions in the wide-angle view mode. This state corresponds to the wide-angle view mode 801 in FIG. 8. The processing in step S401 is executed when the mode has been switched from the mirror view mode to the wide-angle view mode in a state in which the display coordinates after adjustment in the wide-angle view mode are not stored, for example. That is, in this case, the processing in step S303 in FIG. 11 corresponds to the processing in step S401.

On the other hand, when the mode has been switched from the mirror view mode to the wide-angle view mode in a state in which the display coordinates after adjustment in the wide-angle view mode are stored, for example, display according to the processing in steps S203 to S205 in FIG. 10 is performed instead of step S401.

The processing when it has been determined, in step S202, that display coordinates after adjustment in the wide-angle view mode are stored will be described with reference to FIG. 10 again. In this case, in step S203 in FIG. 10, the CMS-ECU 300 acquires the display coordinates in the wide-angle view mode. The display coordinates in the wide-angle view mode that are acquired here are display coordinates stored in step S405, which will be described later.

In step S204, the CMS-ECU 300 creates display images in the wide-angle view mode based on the display coordinates in the wide-angle view mode that have been acquired in step S203. For example, the CMS-ECU 300 specifies, in image data obtained by capturing performed by the CMS cameras 303 and 304, first cutout regions 701 in the wide-angle view mode, and creates CMS images corresponding to the image data of the specified first cutout regions 701. Also, the CMS-ECU 300 specifies second cutout regions 702, in the wide-angle view mode, adjacent to the first cutout regions 701, and creates CMS images by compressing/reducing images corresponding to the image data of the specified second cutout regions 702 so as to match the shape/size of the wide-angle view regions. In step S205, the CMS-ECU 300 displays the display images in the wide-angle view mode that have been created in step S204 in the CMS displays 301 and 302. After step S205, the processing in FIG. 10 is ended.

As shown in FIG. 10, when it has been determined, in step S202, that display coordinates after adjustment in the wide-angle view mode are stored, display in the wide-angle view mode is performed based on the display coordinates in the wide-angle view mode. However, the configuration may be such that even when it has been determined, in step S202, that display coordinates after adjustment in the wide-angle view mode are stored, the display in the wide-angle view mode is performed based on the display coordinates after adjustment in the mirror view mode. That is, regardless of whether or not display coordinates after adjustment in the wide-angle view mode are stored, display in the wide-angle view mode may always be performed based on the display coordinates after adjustment in the mirror view mode.

Again, FIG. 12 is referenced to. In step S402, the CMS-ECU 300 determines whether or not a user operation for adjusting the field of view range of a CMS image has been received. Here, upon determining that the user operation has been received, in step S403, the CMS-ECU 300 adjusts the display region following the user operation. Thereafter, in step S404, the CMS-ECU 300 determines whether or not an instruction to switch to the mirror view mode has been received. On the other hand, upon determining that the user operation has not been received in step S402, processing for determining whether or not an instruction to switch to the mirror view mode has been received is executed in step S404.

Upon determining that an instruction to switch to the mirror view mode has not been received in step S404, the processing from step S402 onward is repeated. On the other hand, upon determining that an instruction to switch to the mirror view mode has been received, in step S405, the CMS-ECU 300 stores the coordinates of the display region(s) after adjustment in the wide-angle view mode. Here, the coordinates to be stored are coordinates corresponding to the position(s) adjusted in step S403. Also, following the designation made by the user, the processing in step S405 may be executed or not be executed. Thereafter, in step S406, the CMS-ECU 300 performs display in the mirror view mode. The processing in step S406 will be described later. After step S406, the processing in FIG. 12 is ended.

Figure 13:
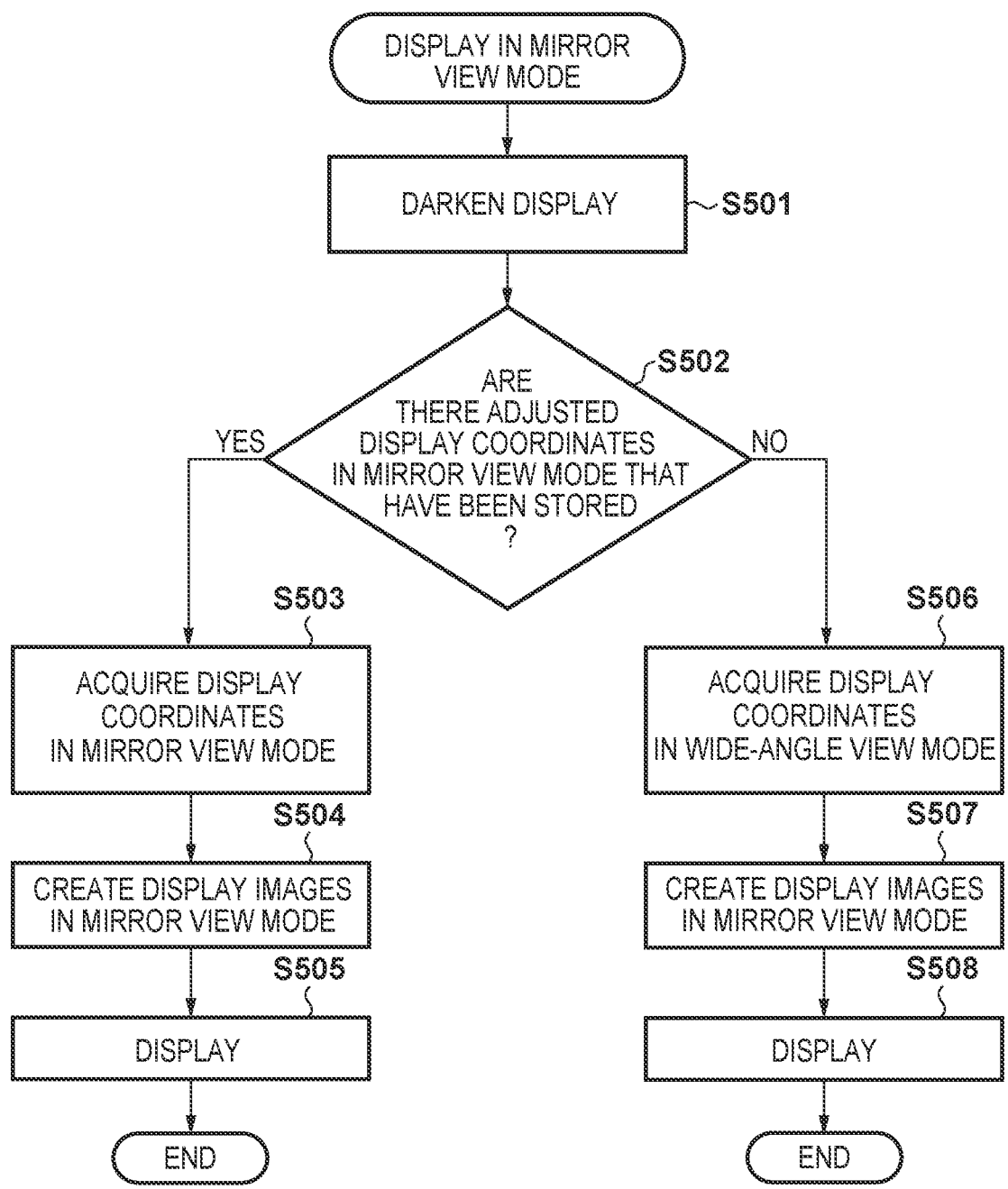
FIG. 13 is a flowchart illustrating processing in step S406 in FIG. 12.

FIG. 13 is a flowchart illustrating the processing in step S406 in FIG. 12. In step S501, the CMS-ECU 300 darkens the display of the CMS displays 301 and 302. In step S502, the CMS-ECU 300 determines whether or not display coordinates after adjustment in the mirror view mode are stored. Note that the processing may be started from step S502 without performing the processing in step S501. When the processing in step S501 is performed, after the screens are darkened, images are displayed in step S505 or step S508. On the other hand, when the processing in step S501 is not performed, an expanding or contracting image is displayed in step S505 or step S508 without the screen having been darkened.

In the following, a case where it has been determined, in step S502, that display coordinates after adjustment in the mirror view mode are not stored will be described. In step S506, the CMS-ECU 300 acquires the display coordinates in the wide-angle view mode. Note that the processing in step S506 need not be performed. For example, if the CMS-ECU 300 can acquire the coordinates at any time as a result of the coordinates being stored in step S405, the processing may be advanced to step S507 from step S502 without performing the processing in step S506.

In step S507, the CMS-ECU 300 creates display images in the mirror view mode based on the display coordinates in the wide-angle view mode that have been acquired in step S506. For example, the CMS-ECU 300 specifies cutout regions according to the size of the display regions in the mirror view mode corresponding to the display coordinates in the wide-angle view mode, in the image data obtained by capturing performed by the CMS camera 303 or 304, and creates CMS images corresponding to the image data of the specified cutout regions. In step S508, the CMS-ECU 300 displays the display images, in the mirror view mode, created in step S507, in the CMS displays 301 and 302. After step S508, the processing in FIG. 13 is ended.

Next, a case where it has been determined, in step S502, that display coordinates after adjustment in the mirror view mode are stored will be described. In step S503, the CMS-ECU 300 acquires the display coordinates in the mirror view mode. The display coordinates, in the mirror view mode, to be acquired here are display coordinates stored in step S105 in FIG. 9.

In step S504, the CMS-ECU 300 creates display images in the mirror view mode based on the display coordinates, in the mirror view mode, acquired in step S503. For example, the CMS-ECU 300 specifies cutout regions 601 according to the size of the display regions in the mirror view mode, in the image data obtained by capturing performed by the CMS cameras 303 and 304, and creates CMS images corresponding to the image data of the specified cutout regions 601. In step S505, the CMS-ECU 300 displays the display images, in the mirror view mode, created in step S504 in the CMS displays 301 and 302. After step S505, the processing in FIG. 13 is ended.

As shown in FIG. 13, upon determining that display coordinates after adjustment in the mirror view mode are stored in step S502, display in the mirror view mode is performed based on these display coordinates in the mirror view mode. However, even when it has been determined that display coordinates after adjustment in the mirror view mode are stored in step S502, the display in the mirror view mode may be performed based on the display coordinates after adjustment in the wide-angle view mode. That is, regardless of whether or not display coordinates after adjustment in the mirror view mode are stored, display in the mirror view mode may always be performed based on the display coordinates after adjustment in the wide-angle view mode.

In this way, in the present embodiment, in the case where display coordinates after adjustment in the mirror view mode are not stored when the mode switches from the wide-angle view mode to the mirror view mode, if the display region has been adjusted by a user operation in the wide-angle view mode, the display image in the mirror view mode is displayed based on the adjustment result. With such a configuration, the user need not perform adjustment of the field of view ranges after switching to the mirror view mode, and the convenience can be improved. On the other hand, if display coordinates after adjustment in the mirror view mode are stored, display images in the mirror view mode are displayed based on the display coordinates. With such a configuration, when the mode was switched from the mirror view mode to the wide-angle view mode, and thereafter has been switched to the mirror view mode, for example, because the display images displayed in the prior mirror view mode are displayed, the user need not adjust the field of view ranges again, and as a result, the convenience can be improved.

As already described above, in the wide-angle view mode, although the user can adjust the position of an image displayed in the display region in the CMS display 301, the adjustable amount therein is greatly limited relative to the adjustable amount in the mirror view mode. For example, in the present embodiment, adjustment in only two stages in the vertical direction relative to the default region is possible, as shown in FIG. 7A. When adjustment in only one of the vertical direction and the horizontal direction is possible in the wide-angle view mode, only the adjustment amount in the one of the vertical direction and the horizontal direction, out of the adjustment amount in the mirror view mode, may be passed on to the wide-angle view mode.

Figure 14:
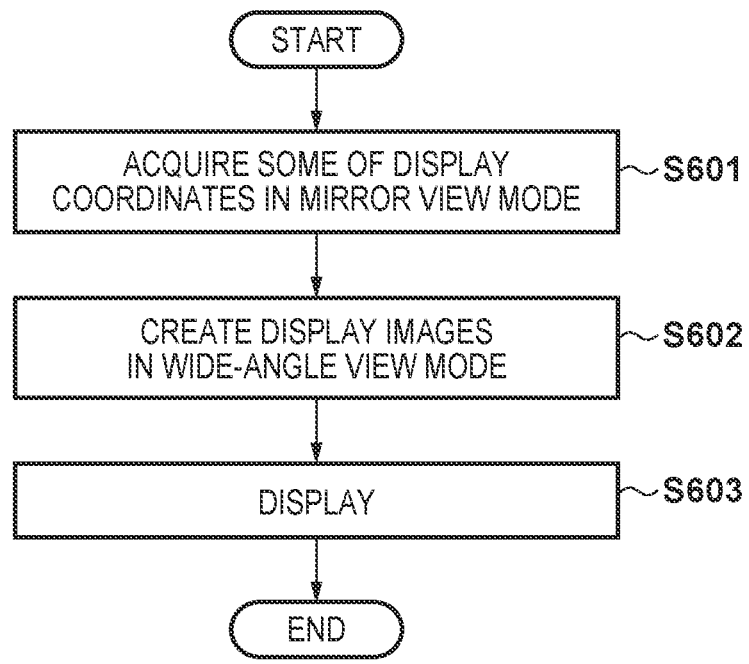
FIG. 14 is a flowchart illustrating processing for passing on some of the adjustment amount in the mirror view mode to the wide-angle view mode.

FIG. 14 is a flowchart illustrating processing for passing on some of the adjustment amount in the mirror view mode to the wide-angle view mode. The processing in FIG. 14 is realized by the CMS-ECU 300 reading out a program stored in a storage region such as a ROM and executing the program, for example. Alternatively, the processing in FIG. 14 may be executed by the controller 200. The processing in FIG. 14 may be executed in place of the processing in FIG. 11, if it has been determined that the adjustment amount is greater than or equal to the predetermined amount in step S206 in FIG. 10, for example.

In step S601, the CMS-ECU 300 acquires some of the coordinates of the display region adjusted in the mirror view mode. For example, the CMS-ECU 300 acquires coordinates of the display region in the horizontal direction, out of the coordinates of the display region adjusted in the mirror view mode. As shown in FIG. 7A, if the direction in which adjustment is possible in the wide-angle view mode is only the vertical direction, in step S601, the CMS-ECU 300 acquires coordinates of the display region in the horizontal direction. On the other hand, if the direction in which adjustment is possible in the wide-angle view mode is only the horizontal direction, in step S601, the CMS-ECU 300 acquires coordinates of the display region in the vertical direction.

In step S602, the CMS-ECU 300 creates display images in the wide-angle view mode based on the some of the display coordinates in the mirror view mode that have been acquired in step S601. For example, the CMS-ECU 300 specifies, in the image data obtained by capturing performed by the CMS cameras 303 and 304, first cutout regions 701, in the wide-angle view mode, corresponding to the display coordinates in the horizontal direction in the mirror view mode and the default coordinates in the vertical direction, and creates CMS images corresponding to the image data of the specified first cutout regions 701. Also, the CMS-ECU 300 specifies second cutout regions 702, in the wide-angle view mode, adjacent to the first cutout regions 701, and creates CMS images by compressing/reducing images corresponding to the image data of the specified second cutout regions 702 so as to match the shape/size of the wide-angle view regions. In step S603, the CMS-ECU 300 displays the display images, in the wide-angle view mode, created in step S602 in the CMS displays 301 and 302. After step S603, the processing in FIG. 14 is ended.

According to the configuration described above, only one of the adjustment amounts in the vertical direction and the horizontal direction, out of the adjustment amounts in the mirror view mode, are passed on to the wide-angle view mode. For example, if the direction in which adjustment is possible in the wide-angle view mode is only the vertical direction, display in the wide-angle view mode is performed based on the coordinates adjusted in the horizontal direction and the default coordinates in the vertical direction. Also, for example, if the direction in which adjustment is possible in the wide-angle view mode is only the horizontal direction, display in the wide-angle view mode is performed based on the coordinates adjusted in the vertical direction and the default coordinates in the horizontal direction.

Also, if it has been determined that the adjustment amount is greater than or equal to the predetermined amount, in step S206 in FIG. 10, the passing on may be performed as follows. For example, if the direction in which adjustment is possible in the wide-angle view mode is only the vertical direction, the coordinates obtained by changing the coordinates adjusted in the vertical direction to the coordinates whose adjustment amount is less than or equal to the predetermined amount in FIG. 15 and is closest to the predetermined amount may be used. On the other hand, if the direction in which adjustment is possible in the wide-angle view mode is only the horizontal direction, the coordinates obtained by changing the coordinates adjusted in the horizontal direction to the coordinates whose adjustment amount is less than or equal to the predetermined amount in FIG. 15 and is closest to the predetermined amount may be used.

According to such a configuration, even if the adjustment amount in the mirror view mode is greater than or equal to the predetermined amount, display in the wide-angle view mode is performed based on some of the adjustment amount made by the user. For example, if the adjustment amount in the mirror view mode is greater than or equal to the predetermined amount, display in the wide-angle view mode is performed based on the largest adjustment amount in a range in which display in the wide-angle view mode is possible. As a result, a sense of incongruity felt by the user can be reduced.

In the present embodiment, a description has been given, in step S301 in FIG. 11, that the default display coordinates in the mirror view mode are of the regions 601 at the default positions, and may be set by the system in advance and be stored in a storage region such as a ROM. The default position may be set in another way other than the predetermined default position. For example, the controller 200 or the CMS-ECU 300 may, as a result of accumulating the adjustment position in the mirror view mode a predetermined number of times, if recognizing a certain tendency in the distribution of the adjustment position, that is, a tendency of distributing in a certain coordinate region, for example, change (update) the predetermined default position based on the distribution.

Summary of Embodiment

The display system in the embodiment described above includes: a shooting unit (CMS camera 303, 304) that shoots a periphery of a vehicle; a display unit (CMS display 301, 302) that displays an image shot by the shooting unit; a display control unit (CMS-ECU 300) that switches the display mode of display of the display unit between a first display mode for displaying a first display region and a second display mode for displaying a second display region that is different from the first display region, wherein when the display mode is switched to the second display mode in a state in which the display range of the display unit has been adjusted in the first display mode, the display control unit displays the second display region based on the adjusted display range (FIG. 10). Also, the second display region is a wide-angle display region relative to the first display region, and the display control unit displays the second display region based on coordinates of the adjusted display range (FIG. 10).

With such a configuration, a user need not perform adjustment of the field of view range after switching to a wide-angle view mode, for example, and the convenience can be improved.

Also, the adjustable amount of the display range in the second display region is smaller than amount by which the display range in the first display region can be adjusted (FIGS. 6A and 6B, FIGS. 7A and 7B). Also, the adjustment of the display range by the display unit is performed when a user operation has been received (FIGS. 6A and 6B, FIGS. 7A and 7B).

With such a configuration, the adjustment of the field of view range by the user in the wide-angle view mode can be limited, for example.

Also, the display control unit displays the second display region using some coordinates of the coordinates of the adjusted display range (FIG. 14). Also, if the adjustment amount of the adjusted display range is greater than or equal to a predetermined amount, the display control unit displays the second display region using default coordinates in the first display mode. Also, if the adjustment amount of the adjusted display range is greater than or equal to the predetermined amount, the display control unit displays the second display region using a largest amount that can be used in the second display mode.

With such a configuration, even if the adjustment amount in a mirror view mode is greater than or equal to a predetermined amount, for example, the display in the wide-angle view mode is performed based on some of the adjustment amount made by the user, and as a result, a sense of incongruity felt by the user can be reduced. Also, display in the wide-angle view mode can be performed using adjusted coordinates only in a horizontal direction and default coordinates in a vertical direction or coordinates related to a limiting value.

Also, the display system further includes a first storage unit that stores, when the display range has been adjusted in the first display mode, the adjusted display range (S105), wherein when the display mode is switched from the first display mode to the second display mode, and then to the first display mode, the display control unit displays the first display region based on the adjusted display range stored in the first storage unit (S505).

With such a configuration, when the display mode is switched from the first display mode to the second display mode, and again to the first display mode, for example, the user need not again perform adjustment, and as a result, the convenience can be improved.

Also, the display system further includes a second storage unit that stores, when the display range has been adjusted in the second display mode, the adjusted display range (S405), wherein when the display mode is switched from the second display mode to the first display mode, and then to the second display mode, the display control unit displays the second display region based on the adjusted display range stored in the second storage unit (S205).

With such a configuration, when the display mode is switched from the wide-angle view mode to the mirror view mode, and again to the wide-angle view mode, for example, the user need not again perform adjustment, and as a result, the convenience can be improved.

Also, the shooting unit shoots side-rearward of the vehicle. With such a configuration, the convenience can be improved in a display system using the CMS camera.

The invention is not limited to the foregoing embodiments, and various variations/changes are possible within the spirit of the invention.

What is claimed is:

1. A display system comprising:
    a camera configured to capture an image side-rearward of a vehicle;
    a display unit configured to display the image captured by the camera: and
    at least one processor;
    at least one memory comprising instructions that, when executed, cause the at least one processor to at least:
        cut out a region from the image captured by the camera;
        cause the display unit to display the cut-out region;
        switch a display mode of display of the display unit between a first display mode and a second display mode, wherein the first display mode is a mode causing the display unit to display the image captured by the camera in a predetermined field of view, and the second display mode is a mode causing the display unit to display the image captured by the camera in a wider-angle view than the first display mode,
    wherein when the display mode is switched to the second display mode in a state in which a position of a region to be cut out in the image captured by the camera has been adjusted in the first display mode, the at least one processor specifies a region to be cut out for the wider-angle view based on the adjusted position, and causes the display unit to display the specified region in the second display mode.

2. The display system according to claim 1, wherein
    the at least one processor specifies the region to be cut out for the wider-angle view based on coordinates of the adjusted position.

3. The display system according to claim 1, wherein an amount by which a position of the region to be cut out in the second display mode can be adjusted is smaller than an amount by which a position of a region to be cut out in the first display mode can be adjusted.

4. The display system according to claim 1, wherein the adjustment of the position of the region to be cut out in the first display mode is performed when a user operation has been received.

5. The display system according to claim 1, wherein the at least one processor specifies the region to be cut out for the wider-angle view using some coordinates of the coordinates of the adjusted position of the region to be cut out in the first display mode.

6. The display system according to claim 1, wherein if an adjustment amount of the adjusted position of the region to be cut out in the first display mode is greater than or equal to a predetermined amount, the at least one processor specifies the region to be cut out for the wider-angle view using default coordinates in the first display mode.

7. The display system according to claim 1, wherein if an adjustment amount of the adjusted position of the region to be cut out in the first display mode is greater than or equal to a predetermined amount, the at least one processor specifies the region to be cut out for the wider-angle view using a largest amount that can be used in the second display mode.

8. The display system according to claim 1, wherein when the position of the region to be cut out has been adjusted in the first display mode, the at least one processor stores, in a first storage unit, the adjusted position of the region to be cut out,
    wherein when the display mode is switched from the first display mode to the second display mode, and then to the first display mode, the at least one processor causes the display unit to display the cut-out region based on the adjusted position stored in the first storage unit.

9. The display system according to claim 1, wherein when the position of the region to be cut out has been adjusted in the second display mode, the adjusted position of the region to be cut out,
    wherein when the display mode is switched from the second display mode to the first display mode, and then to the second display mode, the at least one processor causes the display unit to display the cut-out region based on the adjusted position display range stored in the second storage unit.

10. A vehicle control apparatus comprising:
    at least one processor;
    at least one memory comprising instructions that, when executed, cause the at least one processor to at least:
        control traveling of a vehicle, control a camera configured to capture an image side-rearward of the vehicle, and control a display unit configured to display the image captured by the camera;
        cut out a region from the image captured by the camera;
        cause the display unit to display the cut-out region;
        switch a display mode of display of the display unit between a first display mode and a second display mode, wherein the first display mode is a mode causing the display unit to display the image captured by the camera in a predetermined field of view, and the second display mode is a mode causing the display unit to display the image captured by the camera in a wider-angle view than the first display mode,
    wherein when the display mode is switched to the second display mode in a state in which a position of a region to be cut out in the image captured by the camera has been adjusted in the first display mode, the at least one processor specifies a region to be cut out for the wider-angle view based on the adjusted position, and causes the display unit to display the specified region in the second display mode.

11. A display control method that is executed in a display system including:
   a camera configured to capture an image side-rearward of a vehicle; and
   a display unit configured to display the image captured by the camera,
   the display control method comprising:
      cutting out a region from the image captured by the camera;
      causing the display unit to display the cut-out region;
      switching a display mode of display of the display unit between a first display mode and a second display mode, wherein the first display mode is a mode causing the display unit to display the image captured by the camera in a predetermined field of view, and the second display mode is a mode causing the display unit to display the image captured by the camera in a wider-angle view than the first display mode, and
      when the display mode is switched to the second display mode in a state in which a position of a region to be cut out in the image captured by the camera has been adjusted in the first display mode, specifying a region to be cut out for the wider-angle view based on the adjusted position, and causes the display unit to display the specified region in the second display mode.

12. A display control method that is executed in a vehicle control apparatus controlling traveling of a vehicle, control a camera configured to capture an image side-rearward of the vehicle, and a display unit configured to display the image captured by the camera:
   the display control method comprising:
      cutting out a region from the image captured by the camera;
      causing the display unit to display the cut-out region;
      switching a display mode of display of the display unit between a first display mode and a second display mode, wherein the first display mode is a mode causing the display unit to display the image captured by the camera in a predetermined field of view, and the second display mode is a mode causing the display unit to display the image captured by the camera in a wider-angle view than the first display mode, and
      when the display mode is switched to the second display mode in a state in which a position of a region to be cut out in the image captured by the camera has been adjusted in the first display mode, specifying a region to be cut out for the wider-angle view based on the adjusted position, and causes the display unit to display the specified region in the second display mode.

13. A non-transitory computer-readable storage medium storing a program causing a computer to operate to:
   cut out a region from an image captured by a camera configured to capture an image side-rearward of a vehicle;
   cause a display unit to display the cut-out region;
   switch a display mode of display of the display unit between a first display mode and a second display mode, wherein the first display mode is a mode causing the display unit to display the image captured by the camera in a predetermined field of view, and the second display mode is a mode causing the display unit to display the image captured by the camera in a wider-angle view than the first display mode; and
   when the display mode is switched to the second display mode in a state in which a position of a region to be cut out in the image captured by the camera has been adjusted in the first display mode, specify a region to be cut out for the wider-angle view based on the adjusted position, and causes the display unit to display the specified region in the second display mode.

\* \* \* \* \*